(12) United States Patent
Stein et al.

(10) Patent No.: US 7,895,253 B2
(45) Date of Patent: Feb. 22, 2011

(54) COMPOUND GALOIS FIELD ENGINE AND GALOIS FIELD DIVIDER AND SQUARE ROOT ENGINE AND METHOD

(75) Inventors: Yosef Stein, Sharon, MA (US); Joshua A. Kablotsky, Sharon, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 10/440,330

(22) Filed: May 16, 2003

(65) Prior Publication Data

US 2004/0236812 A1 Nov. 25, 2004

(51) Int. Cl.
G06F 15/00 (2006.01)
(52) U.S. Cl. ...................................... 708/492
(58) Field of Classification Search ......... 708/491–492, 708/400–409
See application file for complete search history.

(56) References Cited

U.S. PATENT DOCUMENTS

| | | | |
|---|---|---|---|
| 3,303,477 A | | 2/1967 | Voigt |
| 3,805,037 A | * | 4/1974 | Ellison ........................ 708/492 |
| 4,722,050 A | | 1/1988 | Lee et al. |
| 4,847,801 A | | 7/1989 | Tong |
| 4,852,098 A | | 7/1989 | Brechard et al. |
| 4,918,638 A | | 4/1990 | Matsumoto et al. |
| 4,975,867 A | * | 12/1990 | Weng ........................ 708/492 |
| 5,095,525 A | | 3/1992 | Almgren et al. |
| 5,101,338 A | | 3/1992 | Fujiwara et al. |
| 5,214,763 A | | 5/1993 | Blaner et al. |
| 5,379,243 A | | 1/1995 | Greenberger et al. |
| 5,386,523 A | | 1/1995 | Crook et al. |
| 5,396,502 A | | 3/1995 | Owsley et al. |
| 5,446,850 A | | 8/1995 | Jeremiah et al. |
| 5,612,910 A | | 3/1997 | Meyer |

(Continued)

FOREIGN PATENT DOCUMENTS

EP    1 246 389 A1    10/2002

(Continued)

OTHER PUBLICATIONS

Horng et al., Fast Inverters and Dividers for Finite Field GF(2m), 1994, IEEE, pp. 206-211.*

(Continued)

*Primary Examiner*—Chat C Do
(74) *Attorney, Agent, or Firm*—Goodwin Procter LLP

(57) ABSTRACT

A Galois field divider engine and method inputs a 1 and a first Galois field element to a Galois field reciprocal generator to obtain an output, multiplies in the Galois field reciprocal generator the first Galois field element by the output of the Galois field reciprocal generator for predicting the modulo remainder of the square of the polynomial product of an irreducible polynomial m−2 times to obtain the reciprocal of the first Galois field element, and multiplies the reciprocal element by a second Galois field element for predicting the quotient of the two Galois field elements in m cycles; in a broader sense the invention includes a compound Galois field engine for performing a succession of Galois field linear transforms on a succession of polynomial inputs to obtain an ultimate output where each input except the first is the output of the previous Galois field linear transform.

13 Claims, 22 Drawing Sheets

U.S. PATENT DOCUMENTS

| | | | |
|---|---|---|---|
| 5,642,367 A | 6/1997 | Kao | |
| 5,689,452 A | 11/1997 | Cameron | |
| 5,696,941 A | 12/1997 | Jung | |
| 5,754,563 A | 5/1998 | White | |
| 5,768,168 A | 6/1998 | Im | |
| 5,832,290 A | 11/1998 | Gostin et al. | |
| 5,890,800 A * | 4/1999 | Meyer | 708/492 |
| 5,964,826 A * | 10/1999 | Wei | 708/492 |
| 5,996,057 A | 11/1999 | Scales, III et al. | |
| 5,996,066 A | 11/1999 | Yung | |
| 5,999,959 A | 12/1999 | Weng et al. | |
| 6,038,577 A * | 3/2000 | Burshtein | 708/492 |
| 6,049,815 A | 4/2000 | Lambert et al. | |
| 6,138,208 A | 10/2000 | Dhong et al. | |
| 6,141,786 A | 10/2000 | Cox et al. | |
| 6,199,086 B1 | 3/2001 | Dworkin et al. | |
| 6,199,087 B1 | 3/2001 | Blake et al. | |
| 6,199,088 B1 * | 3/2001 | Weng et al. | 708/492 |
| 6,209,114 B1 * | 3/2001 | Wolf et al. | 708/492 |
| 6,219,815 B1 * | 4/2001 | DesJardins et al. | 708/492 |
| 6,223,320 B1 | 4/2001 | Dubey et al. | |
| 6,230,179 B1 | 5/2001 | Dworkin et al. | |
| 6,246,768 B1 | 6/2001 | Kim | |
| 6,279,023 B1 * | 8/2001 | Weng et al. | 708/492 |
| 6,317,763 B1 | 11/2001 | Vatinel | |
| 6,349,318 B1 | 2/2002 | Vanstone et al. | |
| 6,384,713 B1 | 5/2002 | Yu | |
| 6,389,088 B1 | 5/2002 | Blois et al. | |
| 6,434,662 B1 | 8/2002 | Greene et al. | |
| 6,438,569 B1 | 8/2002 | Abbott | |
| 6,587,864 B2 | 7/2003 | Stein et al. | |
| 6,766,345 B2 * | 7/2004 | Stein et al. | 708/492 |
| 6,779,011 B2 * | 8/2004 | Weng et al. | 708/492 |
| 6,836,147 B2 * | 12/2004 | Nakaya | 708/505 |
| 7,197,526 B1 * | 3/2007 | Qu | 708/491 |
| 2002/0041685 A1 | 4/2002 | McLoone et al. | |
| 2002/0147825 A1 | 10/2002 | Stein et al. | |
| 2002/0156823 A1 * | 10/2002 | Weng et al. | 708/492 |
| 2003/0103626 A1 | 6/2003 | Stein et al. | |
| 2003/0105791 A1 | 6/2003 | Stein et al. | |
| 2003/0110196 A1 | 6/2003 | Stein et al. | |
| 2003/0115234 A1 | 6/2003 | Stein et al. | |
| 2003/0133568 A1 | 7/2003 | Stein et al. | |
| 2003/0140211 A1 | 7/2003 | Stein et al. | |
| 2003/0140212 A1 | 7/2003 | Stein et al. | |
| 2003/0140213 A1 | 7/2003 | Stein et al. | |
| 2003/0149857 A1 | 8/2003 | Stein et al. | |
| 2003/0182340 A1 * | 9/2003 | Horie | 708/491 |

FOREIGN PATENT DOCUMENTS

| | | |
|---|---|---|
| JP | 2001034167 | 2/2001 |
| JP | 2001084242 | 3/2001 |

OTHER PUBLICATIONS

Huang et al., High-speed easily testable Galois-Field inverter, Sep. 2000, IEEE Transactions on circuits and systems-II: Analog and Digital Signal PRocessing, vol. 48, No. 9, pp. 909-918.*

Popovici et al., Division algorithm over GF(2m), Sep. 1998, IEEE, pp. 1843-1844.*

Viktor Fischer, *Realization of the Round 2 AES Candidates Using Altera FPGA*, (Jan. 26, 2001) <http://csrc.nist.gov/CryptoToolkit/aes/roun2/conf3/papers/24-vfischer.pdf> (Micronic—Kosice, Slovakia).

Máire McLoone and J.V. McCanny, *High Performance Single-Chip FPGA Rijndael Algorithm Implementations*, CHES 2001 PROC, LNCS 2162, 65-76 (ç.K. Koç et al. eds. May 16, 2001).

Elixent, *Changing the Electronic Landscape* (2001) <http://www.elixent.com> (elixent—Bristol, UK).

Elixent Application Note *JPEG Codec* (Dec. 9, 2002) <http://www.elixent.com/assets/jpeg-coder.pdf> (elixent—Bristol, UK).

V. Baumgarte et al., *PACT XPP—A Self-Reconfigurable Data Processing Architecture* (Jun. 2001) <http://www.pactcorp.com/xneu/download/ersa01.pdf> (PACT XPP—Santa Clara, CA).

PACT Informationstechnologie GmbH, *The XPP White Paper Release 2.1* (Mar. 27, 2002) <http://www.pactcorp.com/xneu/download/xpp_white_paper.pdf> (PACT XPP—Santa Clara, CA).

U.S. Appl. No. 10/395,620, filed Mar. 24, 2003, Stein et al.

U.S. Appl. No. 10/665,338, filed Sep. 17, 2003, Stein et al.

* cited by examiner $GF(2^8)^2$

124

$c14 = a7*b7$
$c13 = a7*b6 \oplus a6*b7$
$c12 = a7*b5 \oplus a6*b6 \oplus a5*b7$
$c11 = a7*b4 \oplus a6*b5 \oplus a5*b6 \oplus a4*b7$
$c10 = a7*b3 \oplus a6*b4 \oplus a5*b5 \oplus a4*b6 \oplus a3*b7$
$c9 = a7*b2 \oplus a6*b3 \oplus a5*b4 \oplus a4*b5 \oplus a3*b6 \oplus a2*b7$
$c8 = a7*b1 \oplus a6*b2 \oplus a5*b3 \oplus a4*b4 \oplus a3*b5 \oplus a2*b6 \oplus a1*b7$
$c7 = a7*b0 \oplus a6*b1 \oplus a5*b2 \oplus a4*b3 \oplus a3*b4 \oplus a2*b5 \oplus a1*b6 \oplus a0*b7$
$c6 = a6*b0 \oplus a5*b1 \oplus a4*b2 \oplus a3*b3 \oplus a2*b4 \oplus a1*b5 \oplus a0*b6$
$c5 = a5*b0 \oplus a4*b1 \oplus a3*b2 \oplus a2*b3 \oplus a1*b4 \oplus a0*b5$
$c4 = a4*b0 \oplus a3*b1 \oplus a2*b2 \oplus a1*b3 \oplus a0*b4$
$c3 = a3*b0 \oplus a2*b1 \oplus a1*b2 \oplus a0*b3$
$c2 = a2*b0 \oplus a1*b1 \oplus a0*b2$
$c1 = a1*b0 \oplus a0*b1$
$c0 = a0*b0$

FOR CASE WHERE $a_i = b_i$ ($\beta^2$)

FIG. 15

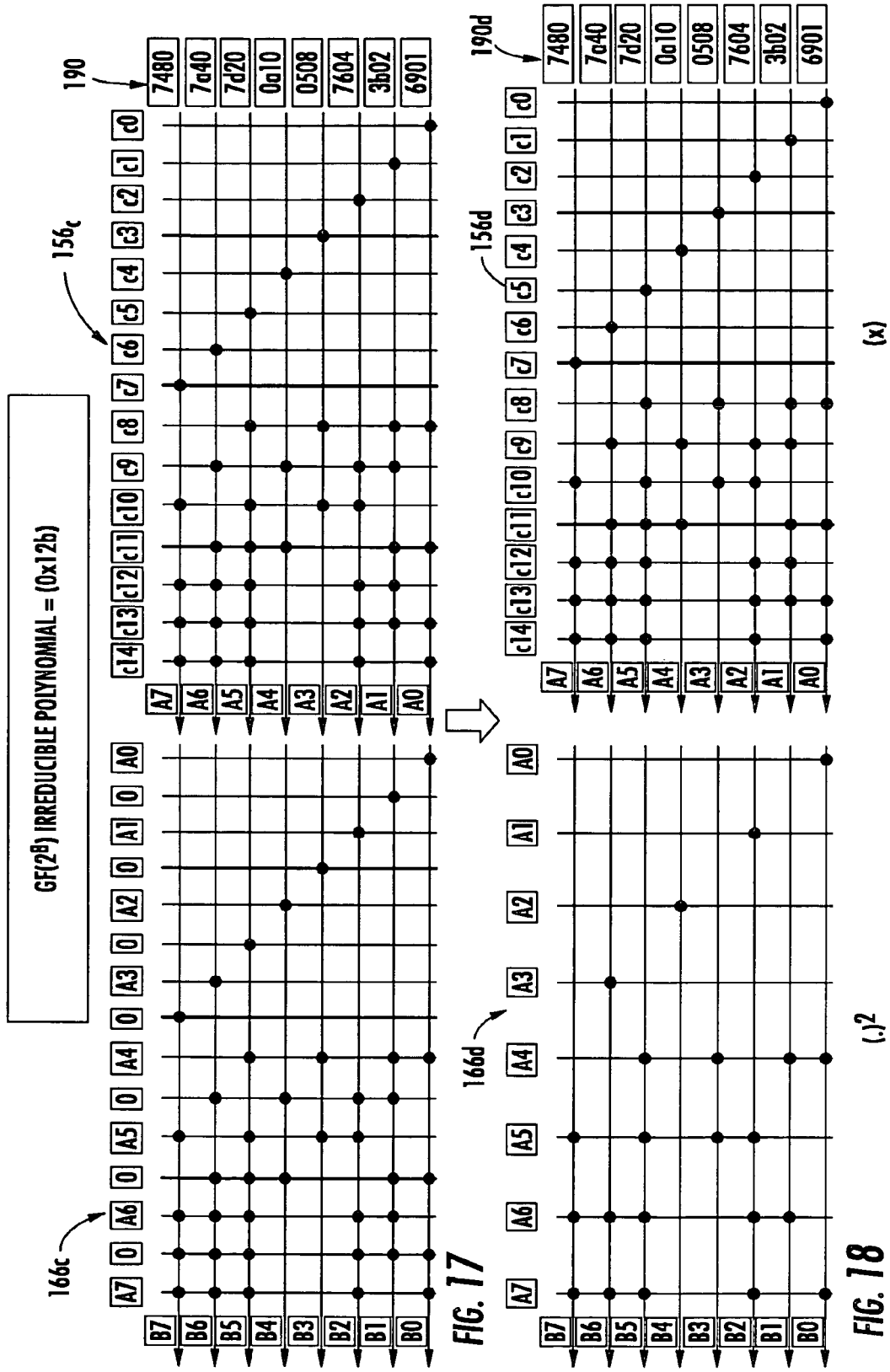

COMPOUND GALOIS FIELD ENGINE AND GALOIS FIELD DIVIDER AND SQUARE ROOT ENGINE AND METHOD

RELATED APPLICATIONS

This application claims priority of U.S. Provisional application Ser. No. 60/417,384, filed Oct. 9, 2002 to Stein et al., entitled COMPACT GALOIS FIELD MULTIPLIER; U.S. Provisional application Ser. No. 60/334,662, filed Nov. 30, 2001 to Stein et al., entitled GF2-ALU; U.S. Provisional application Ser. No. 60/334,510 filed Nov. 30, 2001 to Stein et al., entitled PARALLEL GALOIS FIELD MULTIPLIER; U.S. Provisional application Ser. No. 60/341,635, filed Dec. 18, 2001 to Stein et al., entitled GALOIS FIELD MULTIPLY ADD (MPA) USING GF2-ALU; U.S. Provisional application Ser. No. 60/341,737, filed Dec. 18, 2001, to Stein et al., entitled PROGRAMMABLE GF2-ALU LINEAR FEEDBACK SHIFT REGISTER—INCOMING DATA SELECTION; U.S. Provisional application Ser. No. 60/341,711, filed Dec. 18, 2001 to Stein et al., entitled METHOD FOR DATA ENCRYPTION STANDARD (DES) USING GF2-ALU AND 8 WAY PARALLEL LUT; U.S. patent application Ser. No. 10/395,620 filed Mar. 24, 2003 to Stein et al., entitled COMPACT GALOIS FIELD MULTIPLIER ENGINE; U.S. patent application Ser. No. 10/051,533 filed Jan. 18, 2002 to Stein et al., entitled GALOIS FIELD LINEAR TRANSFORMER; U.S. patent application Ser. No. 10/060,699 filed Jan. 30, 2002 to Stein et al., entitled GALOIS FIELD MULTIPLIER SYSTEM; U.S. patent application Ser. No. 10/228,526 filed Aug. 26, 2002 to Stein et al., entitled GALOIS FIELD MULTIPLY/MULTIPLY—ADD/MULTIPLY ACCUMULATE; and U.S. patent application Ser. No. 10/136,170, filed May 1, 2002 to Stein et al., entitled RECONFIGURABLE INPUT GALOIS FIELD LINEAR TRANSFORMER SYSTEM, the entire disclosures of which are incorporated by reference herein.

FIELD OF THE INVENTION

This invention relates to a Galois field divider engine and method and more generally to a compound Galois field engine for performing a succession of Galois field transforms in one transform operation.

BACKGROUND OF THE INVENTION

Conventional arithmetic logic circuits used for forward error correction and detection, communications, encoding and decoding and general bit manipulation using Galois field linear transformations may be implemented in hardware or software. In certain applications such as encryption and error control coding, it is necessary to perform arithmetic operations, e.g., add, subtract, square root, multiply, and divide over Galois fields. Any such operation between any two members in a Galois field will result in an output (sum, difference, square root, product, quotient) which is another value in the same Galois field. The number of elements in a Galois field is $2^m$ where m is the degree of the field. For example, $GF(2^4)$ would have sixteen different elements in it; $GF(2^8)$ would have 256. A Galois field is generated from an irreducible polynomial in a particular power. Each Galois field of a particular degree will have a number of irreducible polynomials form each of which may be devised a different field using the same terms but in a different order.

Division over a Galois field is done by multiplying the dividend by the reciprocal of the divisor. This divisor reciprocal can be generated in a number of ways. One way is to have a stored look-up table of reciprocals where the divisor is the address for the table. One problem with this approach is that for each field of each irreducible polynomial there must be stored a separate table. In addition, the tables can only be accessed in serial: if parallel operations are required a copy of each table must be provided for each parallel operation. Another approach is to multiply each of the stored Galois field elements by the particular divisor. The value that produces a product of one is then the reciprocal of the particular divisor. Once again all of the values have to be stored and in multiple copies if parallel operation is contemplated. And, a Galois field multiplier is required just to accomplish the retrieval. A third approach uses two linear feedback shift registers (LFSR) each configured to generate a selected Galois field of a particular irreducible polynomial. The first is initialized to the divisor; the second is initialized to "1". Starting from the divisor value the two are clocked synchronously. When the product of the first LFSR equals "1" the divisor has been multiplied by its reciprocal. The product of the second LFSR at that moment is the Galois field element that is the reciprocal of the divisor. One problem with this approach is that for each Galois field of each irreducible polynomial for each degree a different pair of LFSRs is required. In both, the second look-up table approach, above, and the LFSR approach the search for the reciprocal requires up to $2^m-1$ iterations.

BRIEF SUMMARY OF THE INVENTION

It is therefore an object of this invention to provide an improved Galois field divider engine and method.

It is a further object of this invention to provide such an improved Galois field divider engine which can complete the search for the divisor reciprocal in m–1 iterations.

It is a further object of this invention to provide such an improved Galois field divider engine which can be easily reconfigured to accommodate different irreducible polynomial Galois fields of different degrees.

It is a further object of this invention to provide such an improved Galois field divider engine which can function to generate both the divisor reciprocal and multiply it by the dividend.

It is a further object of this invention to provide such an improved Galois field divider engine which requires less power and less area.

It is a further object of this invention to provide more generally an improved, compound Galois field engine for performing a succession of Galois field transforms in one transform operation.

The invention results from the realization that such an improved Galois field division engine and method which is smaller, faster, and more efficient can be achieved with a Galois field reciprocal generator and an input selection circuit for initially inputting a 1 and a first Galois field element to the Galois field reciprocal generator to obtain an output, subsequently multiplying in the Galois field reciprocal generator a first Galois field element by the output of the Galois field reciprocal generator for predicting the modulo remainder of the square of the polynomial product of an irreducible polynomial m–2 times where m is the degree of the Galois field, to obtain the reciprocal of the first Galois field element and multiplying in the Galois field reciprocal engine the reciprocal of the first Galois field element by a second Galois field element for predicting the modulo reminder of the polynomial product for an irreducible polynomial to obtain the quotient of the two Galois field elements in m cycles.

It was also realized, more generally, that an improved compound Galois field engine for performing a succession of Galois field linear transforms on a succession of polynomial inputs to obtain an ultimate output where each input, except the first, is the output of the previous Galois field linear transform can be accomplished with an input circuit for providing a first input and a Galois field linear transformer having a matrix of cells responsive to the first input and configured to, in one transform, immediately predict the modulo remainder of the succession of Galois field linear transforms of an irreducible Galois field polynomial to obtain the ultimate output of the Galois field linear transform directly from the first input.

This invention features a Galois field divider engine including a Galois field reciprocal generator and an input selection circuit for initially inputting a 1 and a first Galois field element to the Galois field reciprocal generator to obtain an output, subsequently multiplying in the Galois field reciprocal generator a first Galois field element by the output of the Galois field reciprocal generator for predicting the modulo remainder of the square of the polynomial product of an irreducible polynomial m−2 times, where m is the degree of the Galois field, to obtain the reciprocal of the first Galois field element and multiplying in the Galois field reciprocal engine the reciprocal of the first Galois field element by a second Galois field element for predicting the modulo remainder of the polynomial product, for an irreducible polynomial to obtain the quotient of the two Galois field elements in m cycles.

In a preferred embodiment, the reciprocal generator may include first and second Galois field multipliers. The first Galois field multiplier may include a first polynomial multiplier circuit and a first Galois field linear transformer. The first Galois field linear transformer may include a matrix of cells. The first Galois field linear transform may include a matrix section and a unity matrix section. The second Galois field multiplier may include a second polynomial multiplier circuit and a second Galois field linear transformer. The second Galois field linear transformer may include a matrix of cells. The second Galois field linear transformer matrix of cells may include a matrix section and a unity matrix section. The output of the first Galois field multiplier may be fed to both multiply inputs of the second Galois field linear multiplier to provide the square of that output. The Galois field reciprocal generator may include a Galois field multiplier including a first polynomial multiplier and a first Galois field transformer and a second Galois field transformer for calculating the square of the first Galois field multiplier output. The second Galois field transformer may be approximately one half the size of the first Galois field transformer. The first and second Galois field transformers each may include a matrix of cells and the second Galois field transformer may include approximately one half the number of cells of the first Galois field transformer. The Galois field reciprocal engine may include a Galois field multiplier and a program circuit for programming the Galois field multiplier to perform a compound multiply-square operation for m−2 times followed by a multiply operation.

The invention also features in a broader sense a compound Galois field engine for performing a succession of Galois field linear transforms on a succession of polynomial inputs to obtain an ultimate output where each input except the first is the output of the previous Galois field linear transform. There is an input circuit for providing a first input and a Galois field linear transformer having a matrix of cells responsive to the first input and configured to, in one transform, immediately predict the modulo remainder of the succession of Galois field linear transforms of an irreducible Galois field polynomial to obtain the ultimate output of the Galois field linear transform directly from the first input.

This invention also features a method of Galois field division including initially inputting a 1 and a first Galois field element to a Galois field reciprocal generator to obtain an output, multiplying in the Galois field reciprocal generator a first Galois field element by the output of the Galois field reciprocal generator for predicting the modulo remainder of the square of the polynomial product of an irreducible polynomial m−2 times where m is the degree of the Galois field to obtain the reciprocal of the first Galois field element, and multiplying in the Galois field reciprocal engine the reciprocal of the first Galois field element by a second Galois field element for predicting the modulo remainder of the polynomial product for an irreducible polynomial to obtain the quotient of the two Galois field elements in m cycles.

This invention also features a Galois field square root engine including a Galois field square root generator and an input circuit for inputting a Galois field element to the Galois field square root generator to obtain the square root of the Galois field elements in one cycle.

In a preferred embodiment, the Galois field square root engine may include a Galois field multiplier, and a program circuit for programming the Galois field multiplier to perform a compound square operation of m−1 times in one cycle.

The invention also features a Galois field square root method including inputting a Galois field element to a Galois field square root generator to obtain an output and squaring in the Galois field square root generator the output of the Galois field square root generator for predicting the modulo remainder of the square of the polynomial product of an irreducible polynomial m−1 times where m is the degree of the Galois field to obtain the square root of the Galois field element in (m−1) cycles.

BRIEF DESCRIPTION OF THE DRAWINGS

Other objects, features and advantages will occur to those skilled in the art from the following description of a preferred embodiment and the accompanying drawings, in which:

FIG. 12 is an illustration the transfer function for the polynomial multiplier of FIG. 11;

FIG. 15 is a chart of the reduced transfer function values for the polynomial multiplier of FIG. 12;

FIG. 17 is a schematic illustration of the pattern of enabled cells of the Galois field linear transformer of FIG. 14;

FIG. 18 is a schematic illustration of the pattern of enabled cells of the Galois field linear transformer of FIG. 16 utilizing the reduced transfer function;

DISCLOSURE OF THE PREFERRED EMBODIMENT

Figure 1:
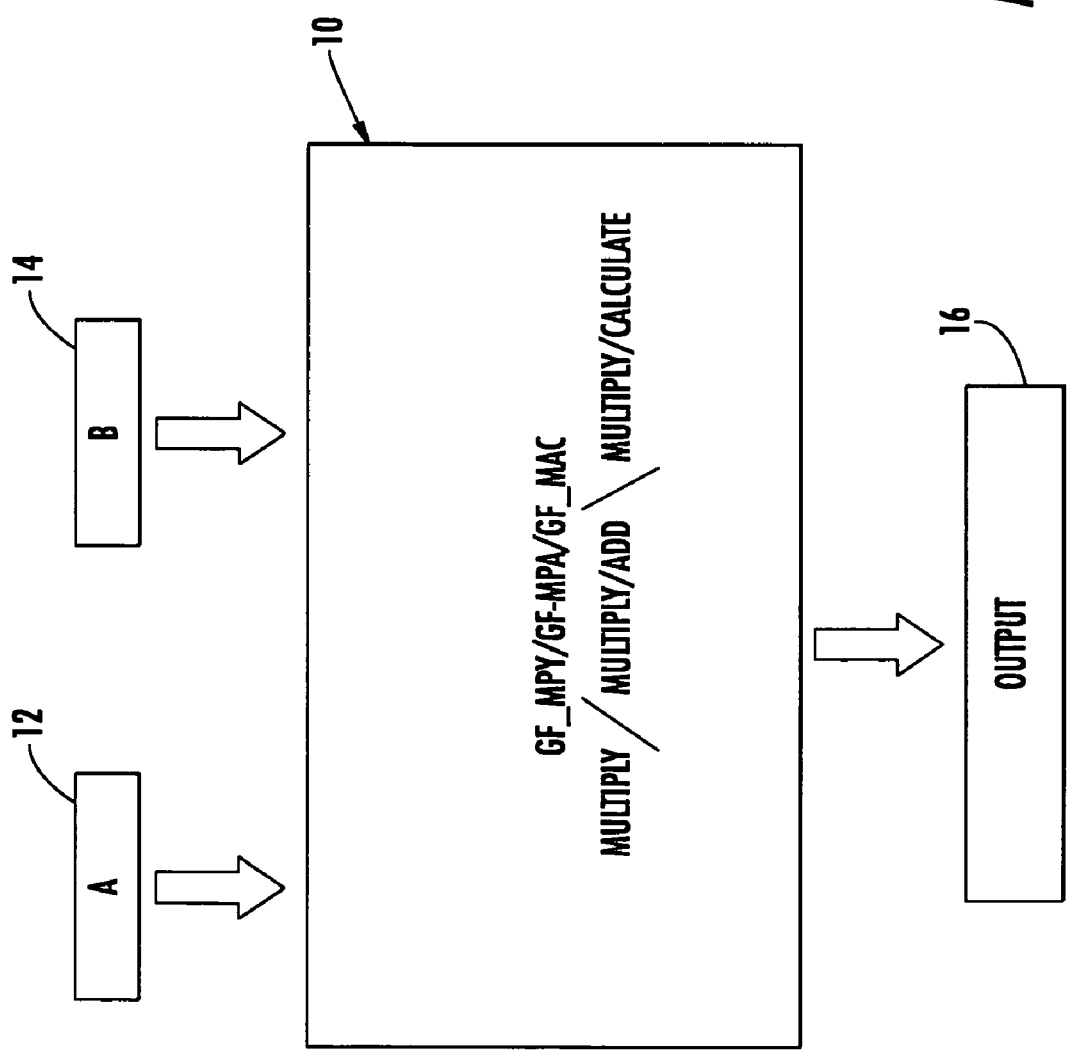
FIG. 1 is a functional block diagram of a compact Galois field multiplier engine according to the invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

Before disclosing the compound Galois field engine and the divisor engine and method of this invention an explanation of Galois field transformers and multipliers is presented for a better understanding.

A Galois field GF(n) is a set of elements on which two binary operations can be performed. Addition and multiplication must satisfy the commutative, associative and distributive laws. A field with a finite number of elements is a finite field. An example of a binary field is the set {0,1} under modulo 2 addition and modulo 2 multiplication and is denoted GF(2). The modulo 2 addition and multiplication operations are defined by the tables shown in the following illustration. The first row and the first column indicate the inputs to the Galois field adder and multiplier. For e.g. 1+1=0 and 1*1=1.

| Modulo 2 Addition (XOR) | | |
| --- | --- | --- |
| + | 0 | 1 |
| 0 | 0 | 1 |
| 1 | 1 | 0 |
| Modulo 2 Multiplication (AND) | | |
| * | 0 | 1 |
| 0 | 0 | 0 |
| 1 | 0 | 1 |

In general, if p is any prime number then it can be shown that GF(p) is a finite field with p elements and that $GF(p^m)$ is an extension field with $p^m$ elements. In addition, the various elements of the field can be generated as various powers of one field element, $\beta$, by raising it to different powers. For example GF(256) has 256 elements which can all be generated by raising the primitive element, $\beta$, to the 256 different powers.

In addition, polynomials whose coefficients are binary belong to GF(2). A polynomial over GF(2) of degree m is said to be irreducible if it is not divisible by any polynomial over GF(2) of degree less than m but greater than zero. The polynomial $F(X)=X^2+X+1$ is an irreducible polynomial as it is not divisible by either X or X+1. An irreducible polynomial of degree m which divides $X^{2^{m-1}}+1$, is known as a primitive polynomial. For a given m, there may be more than one primitive polynomial. An example of a primitive polynomial for m=8, which is often used in most communication standards is $F(X)=0\times11d=x^8+x^4+x^3+x^2+1$.

Galois field addition is easy to implement in software, as it is the same as modulo addition. For example, if 29 and 16 are two elements in $GF(2^8)$ then their addition is done simply as an XOR operation as follows: 29 (11101)⊕16(10000)=13 (01101).

Galois field multiplication on the other hand is a bit more complicated as shown by the following example, which computes all the elements of $GF(2^4)$, by repeated multiplication of the primitive element $\beta$. To generate the field elements for $GF(2^4)$ a primitive polynomial G(x) of degree m=4 is chosen as follows $G(x)=X^4+X+1$. In order to make the multiplication be modulo so that the results of the multiplication are still elements of the field, any element that has the fifth bit set is brought into a 4-bit result using the following identity $F(\beta)=\beta^4+\beta+1=0$. This identity is used repeatedly to form the different elements of the field, by setting $\beta^4=1+\beta$. Thus the elements of the field can be enumerated as follows:

$\{0, 1, \beta, \beta^2, \beta^3, 1+\beta, \beta+\beta^2, \beta^2+\beta^3, 1+\beta+\beta^3, \ldots 1+\beta^3,\}$ since $\beta$ is the primitive element for $GF(2^4)$ it can be set to 2 to generate the field elements of $GF(2^4)$ as {0, 1, 2, 4, 8, 3, 6, 12, 11 . . . 9}.

It can be seen that Galois field polynomial multiplication can be implemented in two basic steps. The first is a calculation of the polynomial product $c(x)=a(x)*b(x)$ which is algebraically expanded, and like powers are collected (addition corresponds to an XOR operation between the corresponding terms) to give $c(x)$.

For example $c(x)=(a_3x^3+a_2x^2+a_1x^1+a_0)*(b_3x^3+b_2x^3+b_1x^1+b_0)$ $c(x)=c_6x^6+c_5x^5+c_4x^4+c_3x^3+c_2x^2+c_1x^1+c_0$ where:

CHART I $c_0 = a_0 * b_0$
$c_1 = a_1 * b_0 \oplus a_0 * b_1$
$c_2 = a_2 * b_0 \oplus a_1 * b_1 \oplus a_0 * b_2$
$c_3 = a_3 * b_0 \oplus a_2 * b_1 \oplus a_1 * b_2 \oplus a_0 * b_3$
$c_4 = a_3 * b_1 \oplus a_2 * b_2 \oplus a_1 * b_3$
$c_5 = a_3 * b_2 \oplus a_2 * b_3$
$c_6 = a_3 * b_3$ The second is the calculation of $d(x)=c(x)$ modulo $p(x)$.

To illustrate, multiplications are performed with the multiplication of polynomials modulo an irreducible polynomial. For example: (if $m(x)=x^8+x^4+x^3+x+1$)

$\{57\}*\{83\}=\{c1\}$ because,

First Step $(x^6 + x^4 + x^2 + 1) + (x^7 + x + 1) = x^{13} \oplus x^{11} \oplus x^9 \oplus x^8 \oplus x^7$
$x^7 \oplus x^5 \oplus x^3 \oplus x^2 \oplus x$
$x^6 \oplus x^4 \oplus x^2 \oplus x \oplus x$
$= x^{13} \oplus x^{11} \oplus x^9 \oplus x^8 \oplus x^6 \oplus$
$x^5 \oplus x^4 \oplus x^3 \oplus 1$ Second Step $x^{13} + x^{11} + x^9 + x^8 + x^6 + x^5 + x^4 +$
$x^3 + 1$ modulo $(x^8 + x^4 + x^3 + x + 1) = x^7 + x^6 + 1$ An improved Galois field multiplier system 10, foreclosing on this approach includes a multiplier circuit for multiplying two polynomials $a_0$-$a_7$ in an A register with the polynomial $b_0$-$b_7$ in an B register with coefficients over a Galois field to obtain their product is given by the fifteen-term polynomial $c(x)$ defined as Chart II. The multiplier circuit actually includes a plurality of multiplier cells.

CHART II $c14 = a7 * b7$
$c13 = a7 * b6 \oplus a6 * b7$
$c12 = a7 * b5 \oplus a6 * b6 \oplus a5 * b7$
$c11 = a7 * b4 \oplus a6 * b5 \oplus a5 * b6 \oplus a4 * b7$
$c10 = a7 * b3 \oplus a6 * b4 \oplus a5 * b5 \oplus a4 * b6 \oplus a3 * b7$
$c9 = a7 * b2 \oplus a6 * b3 \oplus a5 * b4 \oplus a4 * b5 \oplus a3 * b6 \oplus a2 * b7$
$c8 = a7 * b1 \oplus a6 * b2 \oplus a5 * b3 \oplus a4 * b4 \oplus a3 * b5 \oplus a2 * b6 \oplus a1 * b7$
$c7 = a7 * b0 \oplus a6 * b1 \oplus a5 * b2 \oplus a4 * b3 \oplus a3 * b4 \oplus a2 * b5 \oplus a1 * b6 \oplus a0 * b7$
$c6 = a6 * b0 \oplus a5 * b1 \oplus a4 * b2 \oplus a3 * b3 \oplus a2 * b4 \oplus a1 * b5 \oplus a0 * b6$
$c5 = a5 * b0 \oplus a4 * b1 \oplus a3 * b2 \oplus a2 * b3 \oplus a1 * b4 \oplus a0 * b5;$
$c4 = a4 * b0 \oplus a3 * b1 \oplus a2 * b2 \oplus a1 * b3 \oplus a0 * b4$
$c3 = a3 * b0 \oplus a2 * b1 \oplus a1 * b2 \oplus a0 * b3$
$c2 = a2 * b0 \oplus a1 * b1 \oplus a0 * b2$
$c1 = a1 * b0 \oplus a0 * b1$
$c0 = a0 * b0$ The operation of a Galois field multiplier system is explained in U.S. Patent Application to Stein et al. entitled GALOIS FIELD MULTIPLIER SYSTEM Ser. No. 10/060,699 filed Jan. 30, 2002 which is incorporated herein in its entirety by this reference.

Each of the fifteen polynomial $c(x)$ term includes an AND function as represented by an * and each pair of terms are combined with a logical exclusive OR as indicated by a $\oplus$. This product as represented in Chart II is submitted to a Galois field linear transformer circuit which may include a number of Galois field linear transformer units each composed of 15×8 cells, which respond to the product produced by the multiplier circuit to predict the modulo remainder of the polynomial product for a predetermined irreducible polynomial. The $A_0$, $B_0$ multiplication is performed in a first unit the $A_1$, $B_1$ in a second unit, the $A_2$, $B_2$ in a third unit, and the $A_n$, $B_n$ in the last unit. The operation of a Galois field linear transformer circuit and each of its transformer units is explained in U.S. Patent Application to Stein et al. entitled GALOIS FIELD LINEAR TRANSFORMER Ser. No. 10/051,533 with a filing date of Jan. 18, 2002, which is incorporated herein in its entirety by this reference. Each of the Galois field linear transformer units predicts the modulo remainder by dividing the polynomial product by an irreducible polynomial. That irreducible polynomial may be, for example, anyone of those shown in Chart III.

CHART III

| | |
|---|---|
| :GF($2^1$) | |
| 0x3 | (x + 1) |
| :GF($2^2$) | |
| 0x7 | ($x^2$ + x + 1) |
| :GF($2^3$) | |
| 0xB | ($x^3$ + x + 1) |
| 0xD | ($x^3$ + $x^2$ + 1) |
| :GF($2^4$) | |
| 0x13 | ($x^4$ + x + 1) |
| 0x19 | ($x^4$ + $x^3$ + 1) |
| :GF($2^5$) | |
| 0x25 | ($x^5$ + $x^2$ + 1) |
| 0x29 | ($x^5$ + $x^3$ + 1) |
| 0x2F | ($x^5$ + $x^3$ + $x^2$ + x + 1) |
| 0x37 | ($x^5$ + $x^4$ + $x^2$ + x + 1) |
| 0x3B | ($x^5$ + $x^4$ + $x^3$ + x + 1) |
| 0x3D | ($x^5$ + $x^4$ + $x^3$ + $x^2$ + 1) |

CHART III-continued

:GF($2^6$)

| | |
|---|---|
| 0x43 | ($x^6 + x + 1$) |
| 0x5B | ($x^6 + x^4 + x^3 + x + 1$) |
| 0x61 | ($x^6 + x^5 + 1$) |
| 0x67 | ($x^6 + x^5 + x^2 + x + 1$) |
| 0x6D | ($x^6 + x^5 + x^3 + x^2 + 1$) |
| 0x73 | ($x^6 + x^5 + x^4 + x + 1$) |

:GF($2^7$)

| | |
|---|---|
| 0x83 | ($x^7 + x + 1$) |
| 0x89 | ($x^7 + x^3 + 1$) |
| 0x8F | ($x^7 + x^3 + x^2 + x + 1$) |
| 0x91 | ($x^7 + x^4 + 1$) |
| 0x9D | ($x^7 + x^4 + x^3 + x^2 + 1$) |
| 0xA7 | ($x^7 + x^5 + x^2 + x + 1$) |
| 0xAB | ($x^7 + x^5 + x^3 + x + 1$) |
| 0xB9 | ($x^7 + x^5 + x^4 + x^3 + 1$) |
| 0xBF | ($x^7 + x^5 + x^4 + x^3 + x^2 + x + 1$) |
| 0xC1 | ($x^7 + x^6 + 1$) |
| 0xCB | ($x^7 + x^6 + x^3 + x + 1$) |
| 0xD3 | ($x^7 + x^6 + x^4 + x + 1$) |
| 0xE5 | ($x^7 + x^6 + x^5 + x^2 + 1$) |
| 0xF1 | ($x^7 + x^6 + x^5 + x^4 + 1$) |
| 0xF7 | ($x^7 + x^6 + x^5 + x^4 + x^2 + x + 1$) |
| 0xFD | ($x^7 + x^6 + x^5 + x^4 + x^3 + x^2 + 1$) |

:GF($2^8$)

| | |
|---|---|
| 0x11D | ($x^8 + x^4 + x^3 + x^2 + 1$) |
| 0x12B | ($x^8 + x^5 + x^3 + x + 1$) |
| 0x12D | ($x^8 + x^5 + x^3 + x^2 + 1$) |
| 0x14D | ($x^8 + x^6 + x^3 + x^2 + 1$) |
| 0x15F | ($x^8 + x^6 + x^4 + x^3 + x^2 + x + 1$) |
| 0x163 | ($x^8 + x^6 + x^5 + x + 1$) |
| 0x165 | ($x^8 + x^6 + x^5 + x^2 + 1$) |
| 0x169 | ($x^8 + x^6 + x^5 + x^3 + 1$) |
| 0x171 | ($x^8 + x^6 + x^5 + x^4 + 1$) |
| 0x187 | ($x^8 + x^7 + x^2 + x + 1$) |
| 0x18D | ($x^8 + x^7 + x^3 + x^2 + 1$) |
| 0x1A9 | ($x^8 + x^7 + x^5 + x^3 + 1$) |
| 0x1C3 | ($x^8 + x^7 + x^6 + x + 1$) |
| 0x1CF | ($x^8 + x^7 + x^5 + x^3 + x^2 + x + 1$) |
| 0x1E7 | ($x^8 + x^7 + x^6 + x^5 + x^2 + x + 1$) |
| 0x1F5 | ($x^8 + x^7 + x^5 + x^4 + x^2 + 1$) |

The Galois field multiplier presented here GF($2^8$) is capable of performing with powers $2^8$ and powers $2^4$ and under as shown in Chart III.

An example of the GF multiplication occurs as follows:

| Before GF( ) multiplication; Polynomial 0x11d | | | | | After GF9( ) multiplication; Polynomial 0x11d | | | |
|---|---|---|---|---|---|---|---|---|
| GF( ) | 45 | 23 | 00 | 01h | GF( ) | 45 | 23 | 00 | 01h |
| | 57 | 34 | 00 | 01h | | 57 | 34 | 00 | 01h |
| | xx | xx | xx | xxh | | 72 | 92 | 00 | 01h |

There is shown in FIG. 1 a compact Galois field multiplier engine 10 accompanied by an A input register 12, B input register 14 and an output register 16. Compact Galois field engine 10 is capable of a number of different operations, including multiply, multiply-add and multiply-accumulate.

Figure 2:
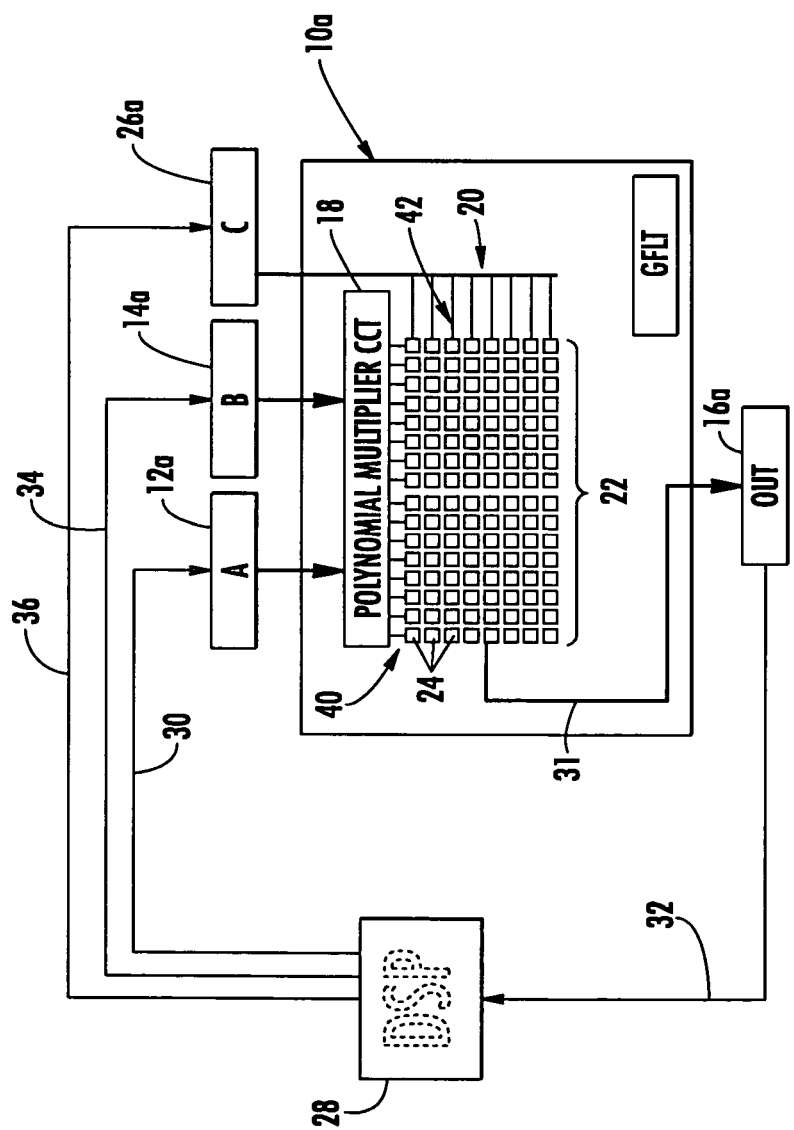
FIG. 2 is a more detailed functional block diagram of a conventional Galois field multiplier engine according to the invention.

Conventional Galois field multiplier engine 10a, FIG. 2, requires three registers, A register 12a, B register 14a and C register 26a. The burden of these registers must be carried by the associated digital signal processor (DSP) core 28 and require extensive external bus work. In addition to bus 30, for supplying data to A register 12a, bus 34 for supplying data to B register 14a and bus 36 for supplying data to C register 26a, there is required a bus 32 for feeding back the output from register 16a to the digital signal processor 28 and bus 34 or bus 36 for feeding back that output from digital signal processor 28 to B register 14a or C register 26a. Bus 31 connects the output of Galois field linear transformer circuit 20 and output register 16a. Thus polynomial multiplier circuit 18 can provide to the multiple input 40 of matrix 22 of Galois field linear transformer circuit 20 the proper values in conjunction with the values fed from C register 26a to the adder input 42 of matrix 22 to perform multiply, multiply-add and multiply-accumulation functions. Matrix 22 is shown here as an eight by fifteen matrix for supporting multiplication of polynomials of power eight but may be made larger or smaller, containing more or fewer cells 24, depending upon the power of the polynomial to be serviced.

Figure 3:
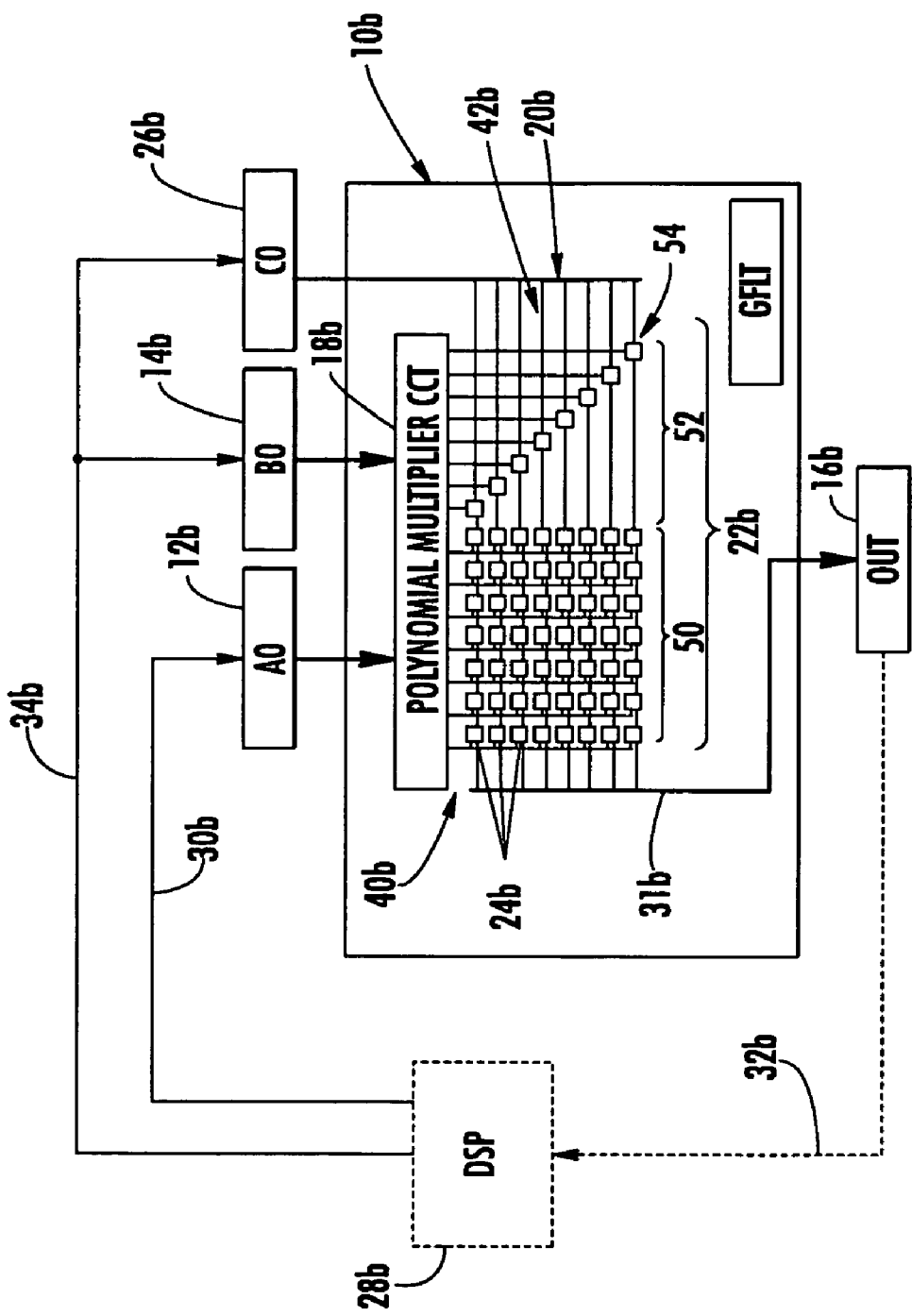
FIG. 3 is a more detailed functional block diagram of the compact Galois field multiplier engine of FIG. 1 displaying the reduced size Galois field linear transformer unity matrix feature of the invention.

The number of cells 24b per row, FIG. 3, of matrix 22b of Galois field linear transformer circuit 20b in engine 10b maybe reduced by nearly half, by configuring matrix 22b into two matrix sections, a matrix section 50 and a unity matrix section 52. The unity matrix section requires only one set of cells 54 wherein these unity matrix section cells represent the prediction of the remainder when the output of the multiplier circuit is a polynomial with a power less than the power of the irreducible polynomial. Thus in FIG. 3 where the irreducible polynomial has a power of eight any polynomial of less than eight will not exceed the modulo and will be passed right through the matrix, thus the absent cells in unity matrix section 52 are unnecessary. This saves nearly half of the cells required for the matrix 22b resulting in a smaller, simpler and faster engine.

Figure 4:
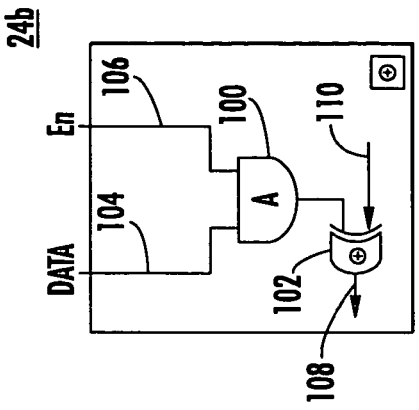
FIG. 4 is a schematic of a typical programmable X-OR circuit cell for the matrix of the Galois field linear transformer circuit of FIGS. 2 and 3.

Each cell 24b, FIG. 4, may include an AND circuit 100 and an exclusive OR circuit 102. There is a data input 104 and an enable input 106. Exclusive OR circuit 102 provides an output on line 108 to the input of the next exclusive OR circuit and receives at its input 110 the output from the previous exclusive OR circuit, except for the last exclusive OR circuit whose output is connected to the output of the matrix and the first exclusive OR circuit whose input is connected to the adder input 42b, FIG. 3, or 42g, FIG. 9. An enable signal on line 106 enables the data on line 104 to pass through AND gate 100 and to be exclusively ORed by exclusive OR circuit 102 with the input on line 110. The lack of an enabling signal on line 106 simply passes the input on line 110 through the exclusive OR gate 102 to output line 108. An enabling signal on line 106 enables cell 24. In this manner the entire matrix maybe reconfigured for any particular irreducible polynomial.

Figure 5:
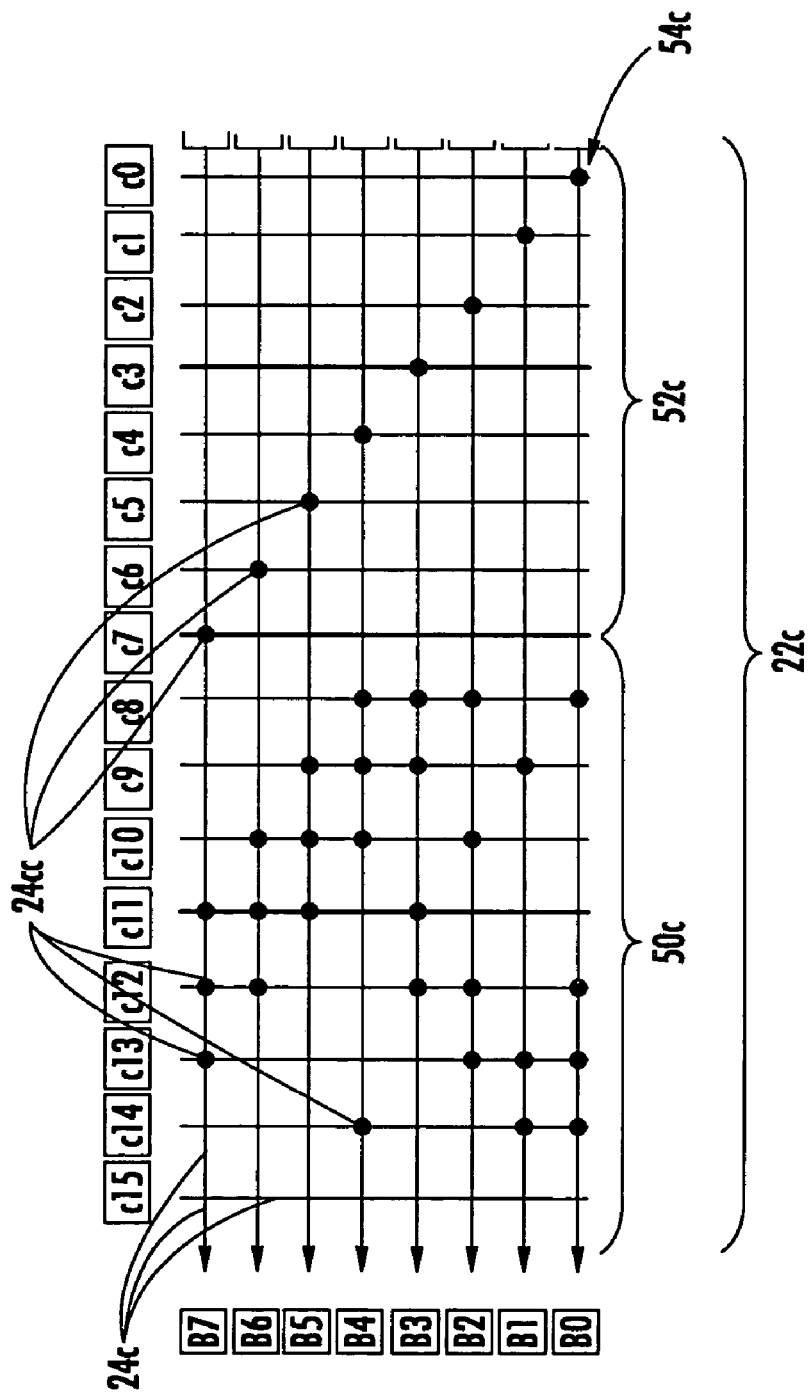
FIG. 5 is a simplified schematic diagram of the Galois field linear transformer circuit of FIGS. 3 and 9 illustrating the programming of the matrix section and unity matrix section cells according to the invention for a particular polynomial of power eight.
Figure 6:
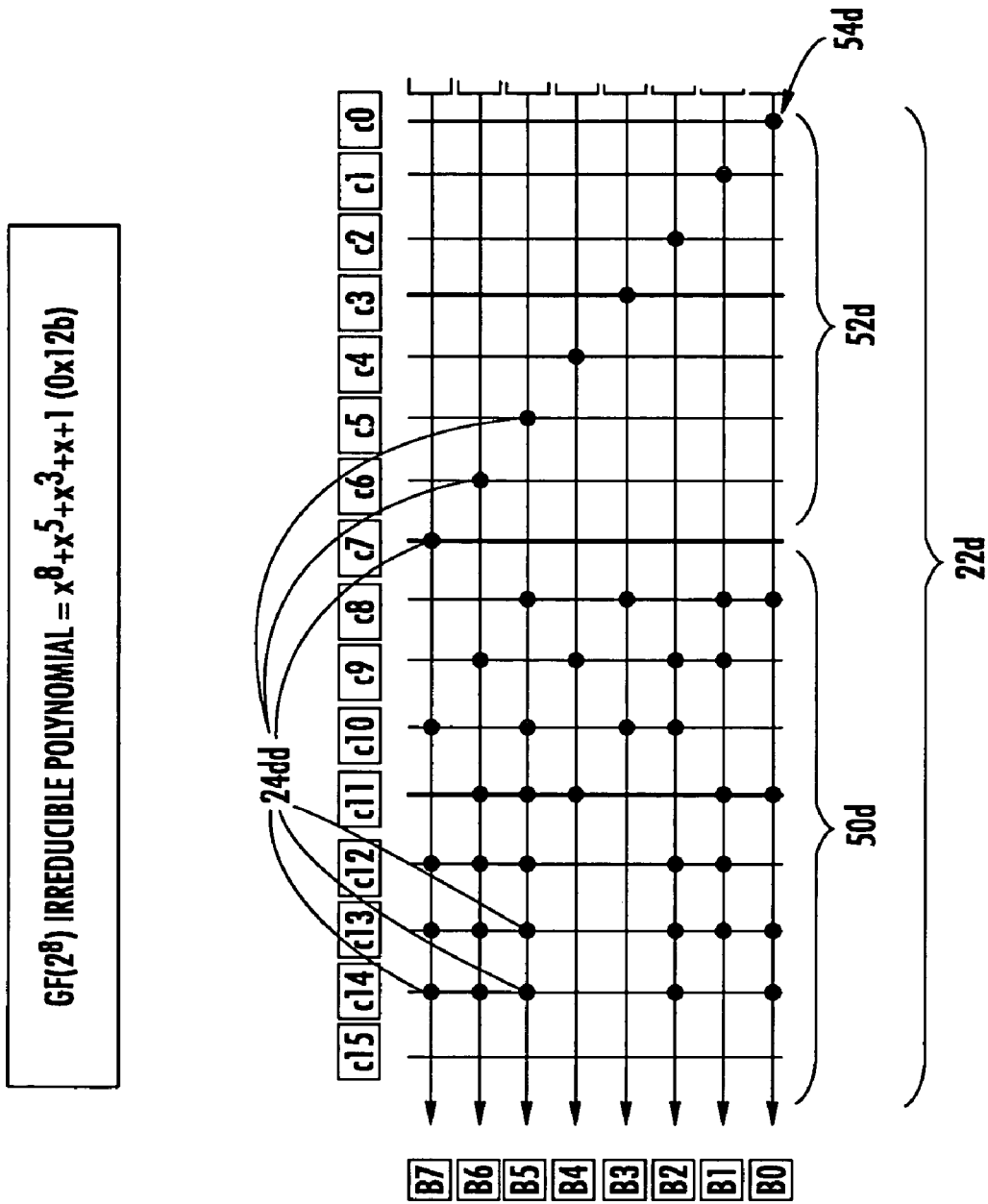
FIG. 6 is a simplified schematic diagram of the Galois field linear transformer circuit of FIGS. 3 and 9 illustrating the programming of the matrix section and unity matrix section cells according to the invention for another polynomial of power eight.

The efficacy of engine 10b, FIG. 3, can be understood by choosing an irreducible polynomial from Chart III, supra, and implementing it by enabling the necessary cells. For example, to implement the first polynomial of power eight designated 0x11d representing the irreducible polynomial $x^8+x^4+x^3+x^2+1$, the enabled cells, indicated generally at 24cc, form a unity matrix 52c, FIG. 5, with a line of cells 54c as previously depicted in FIG. 3. When choosing the second irreducible polynomial from Chart III, 0x12b, the irreducible polynomial $x^8+x^5+x^3+x+1$ produces a pattern of enabled cells 24dd, FIG. 6, in matrix section 50d and unity matrix 52d where once again the unity matrix section 52d results in a line of enabled cells 54d.

Figure 7:
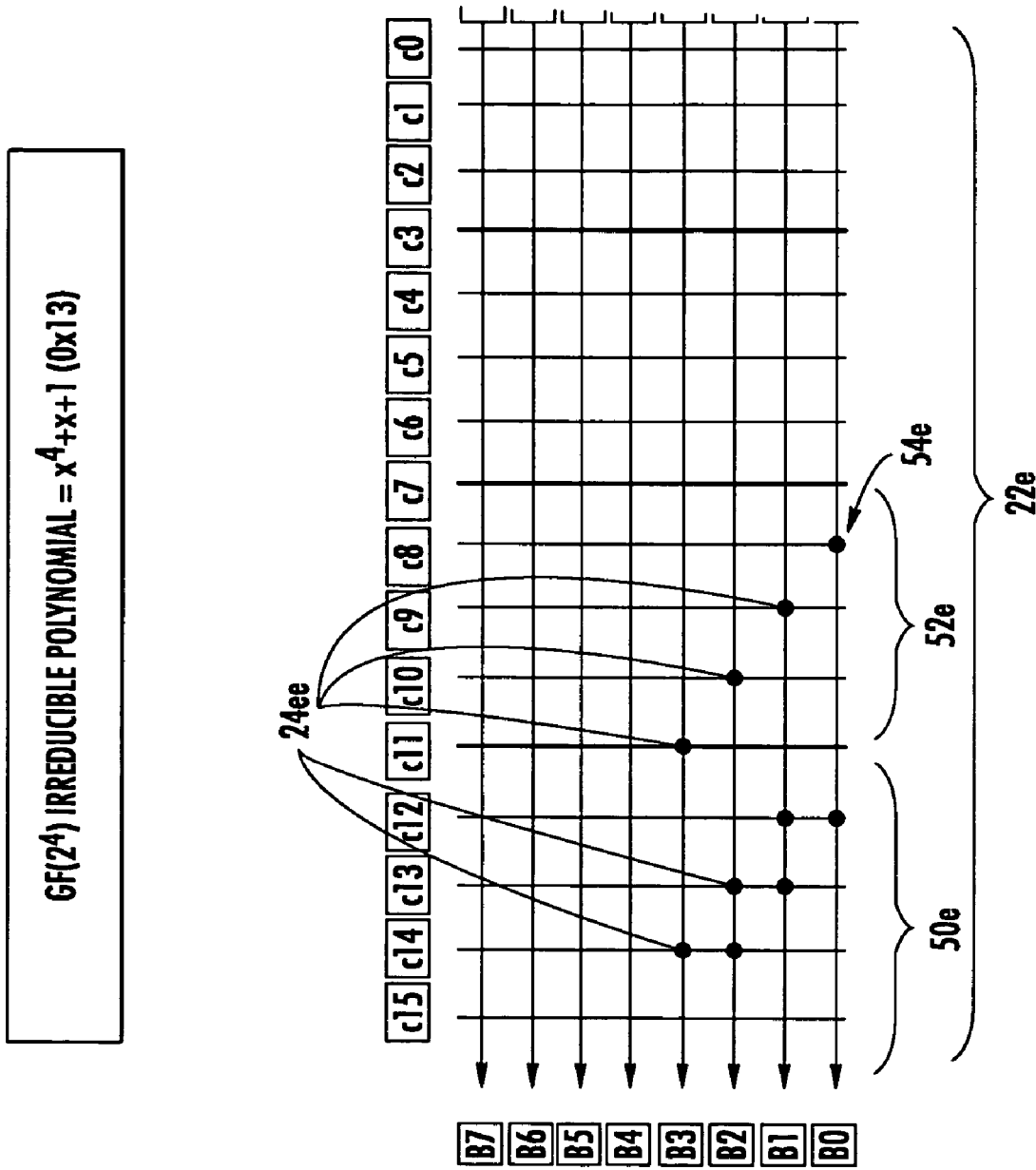
FIG. 7 is a simplified schematic diagram of the Galois field linear transformer circuit of FIGS. 3 and 9 illustrating the programming of the matrix section and unity matrix section cells according to the invention for yet another polynomial of power four.

The reduction in the number of required cells is not limited to only polynomials having the same power as the irreducible polynomial. It also applies to any of those having the power of one half or less of the power of the irreducible polynomial. For example, the eight by fifteen matrix 22b, shown in FIG. 3 and referred to by way of explanation in FIGS. 5 and 6 could also support polynomials to the power of one, two, three, or four, but not powers of five, six and seven, if the irreducible polynomial power was sixteen the matrix that supported it could also support polynomials up to eight, but not nine through fifteen. If it were the power of thirty-two it could support polynomials of thirty-two power and up to sixteen, but not seventeen through thirty-one. For example, as shown in FIG. 7 for an irreducible polynomial of the fourth power both the matrix section 50e and unity matrix section 52e become smaller and can be implemented anywhere within matrix 22e. Here the matrix section 50e has a plurality of enabled cells 24ee along with the enabled cells in unity matrix 52e which now has a smaller line of enabled cells 54e, making up the unity matrix section 52e.

Figure 8:
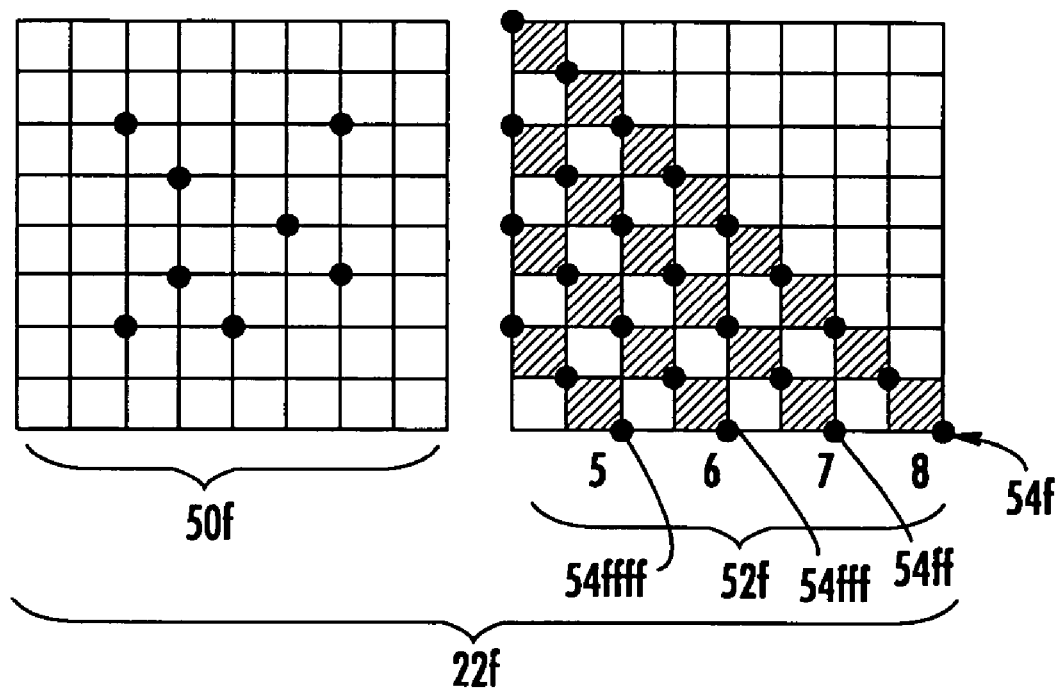
FIG. 8 is a simplified schematic diagram of the Galois field linear transformer circuit of FIGS. 3 and 9 illustrating the programming of a second matrix section as a sparse matrix for supporting polynomial powers between half (4) powers and full (8) powers in this particular embodiment.

If it is desirable to service the intermediate polynomials of power five, six and seven the unity matrix section can be replaced with a sparse matrix section 52f, FIG. 8, wherein additional lines of enabled cells 54ff, 54fff, 54ffff, can be employed to support polynomials of power seven, six and five respectively. But it is somewhat less of a reduction in the size of the matrix and required number of cells.

Figure 9:
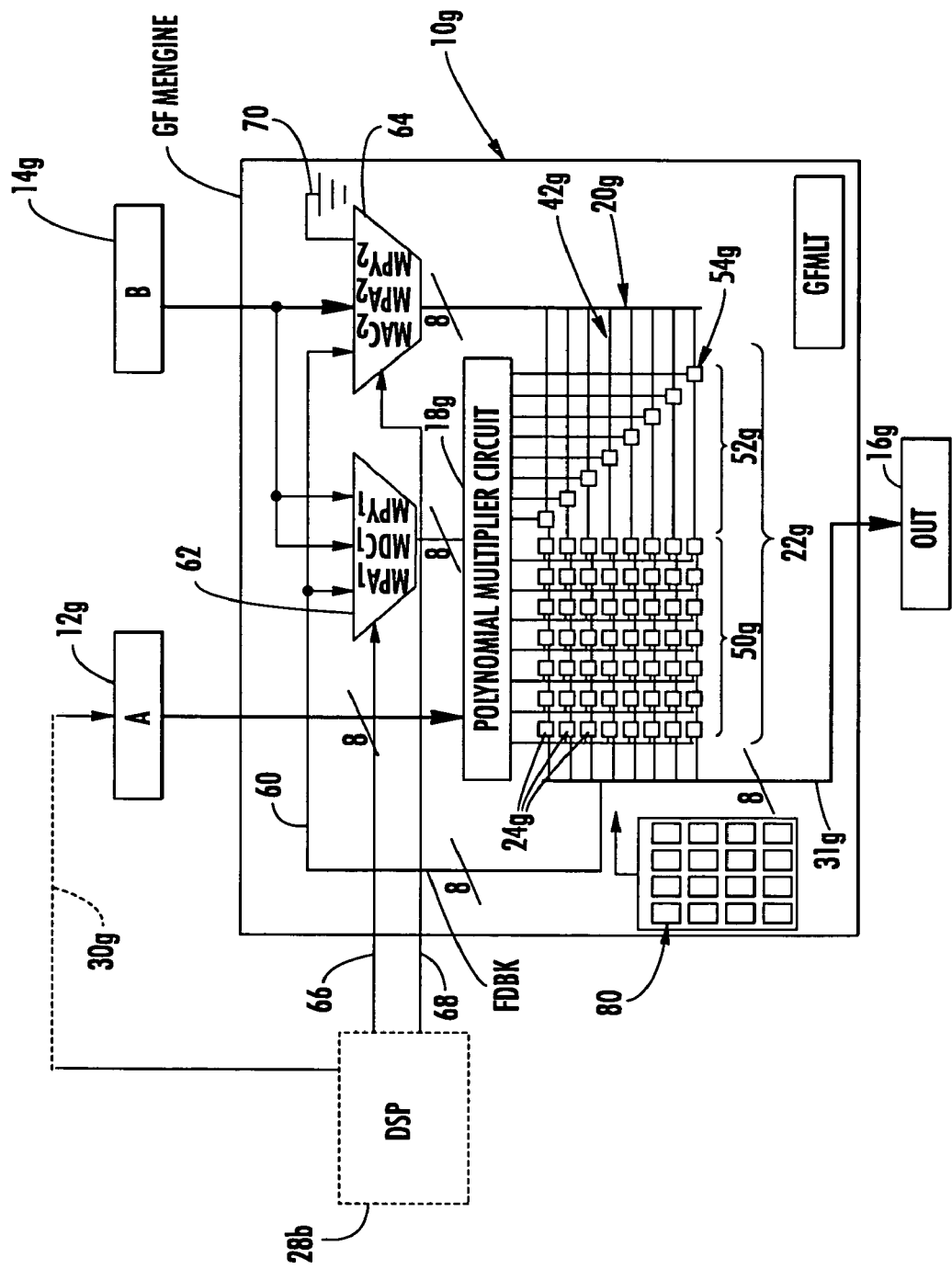
FIG. 9 is a more detailed block diagram of a compact Galois field multiplier engine of FIG. 1 incorporating both the reduced size matrix and the reduced hardware and localized bus features of the invention.

The number of input registers can be reduced from three to two and the number of external buses relied upon to communicate with the digital signal processor (DSP) 28g, FIG. 9, can be reduced and localized to be internal of the engine 10g itself. Thus, as shown in FIG. 9, there are but two input registers A 12g and B 14g and the feedback from output 31g does not need to go through DSP 28g but goes directly, locally, on engine 10g through internal bus 60 to multiplier input selection circuit 62 and adder input selection circuit 64. Digital signal processor 28g need only provide control signals on line 66 to multiplier input selection circuit 62 and on line 68 to adder input selection circuit 64. Thus in the multiply mode, multiplier input selection circuit 62, passes an input from B register 14g to polynomial multiplier circuit 18g while adder input selection circuit 64 provides an additive identity level, in this case, a ground level 70 to the adder input 42g of Galois field linear transformer circuit 20g. In the multiply-add mode digital signal processor 28 instructs multiplier input selection circuits 62 to feed back the output from matrix 22g over line 60 to polynomial multiplier circuit 18g and instructs adder input selection circuits 64 to pass the polynomial in B register 14g to the adder input 42g of Galois field linear transformer circuit 20g. In the multiply-accumulate mode digital signal processor 28g instructs multiplier input selection circuit 62 to deliver the polynomial from B register 14g to polynomial multiplier circuit 18g and instructs adder input selection circuit 64 to feed back the output on line 60 of Galois field linear transformer circuit 20g.

Another feature is the reconfigurability of Galois field linear transformer circuit 20g by virtue of the selective enablement of cells 24g. Reconfigurable control circuit 80 selectively enables the ones of cells 24g required to implement the coefficients of the selected irreducible polynomial and itself can be reduced in size since the number of cells it needs to control has been reduced.

The operation of a reconfigurable input Galois field linear transformer circuit is explained in U.S. patent application Ser. No. 10/136,170, filed May 1, 2002 to Stein et al., entitled RECONFIGURABLE INPUT GALOIS FIELD LINEAR TRANSFORMERER SYSTEM and all its priority applications and documents which are incorporated herein in their entirety by this reference.

Figure 10:
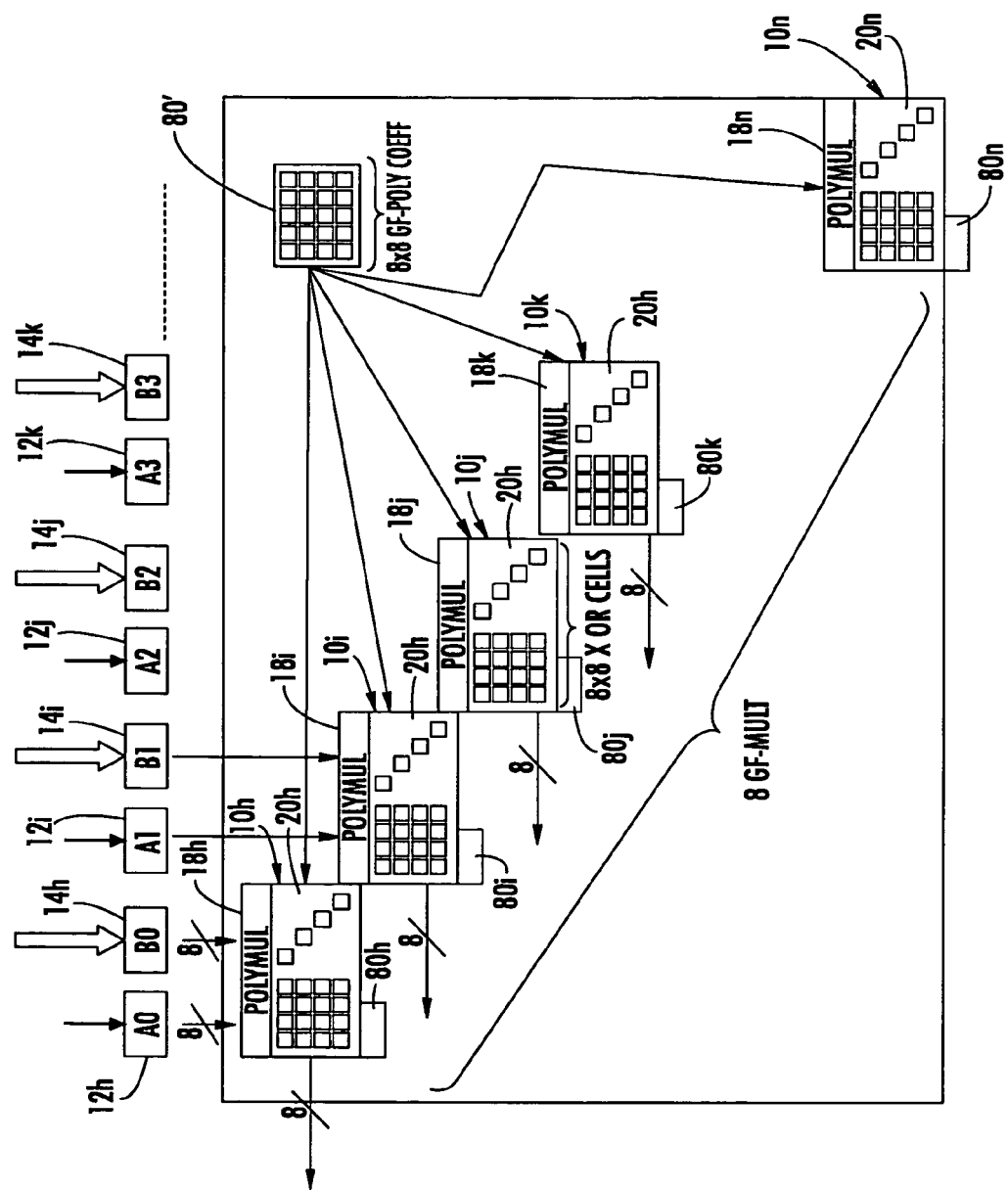
FIG. 10 is a block diagram of Galois field multiplier engine according to the invention employing a number of Galois field linear transformer units.

Although thus far for the sake of simplicity the explanation has been with respect to only one engine, a number of the engines may be employed together as shown in FIG. 10 where each engine has a multiplier circuit 10h, 10i, 10j, 10k . . . 10n and a Galois field linear transformer 20h, 201, 20j, 20k . . . 20n circuit. With a single central reconfigurable control circuit $80^1$ controlling them all. These engines can share the same wide [32, 64, 128] bit A and B registers were each operates on a different 8 bit (Byte) segment, or each can be serviced by its own reconfigurable control unit 80h, 80i, 80j, 80k . . . 80n and each by its own pair of A and B registers $A_0$, and $B_0$ 12h, and 14h; $A_1$ and, $B_1$, 12i, and 14i; $A_2$ and $B_2$, 12j and 14j, $A_3$ and $B_3$ 12k and 14k and so on.

Figure 11:
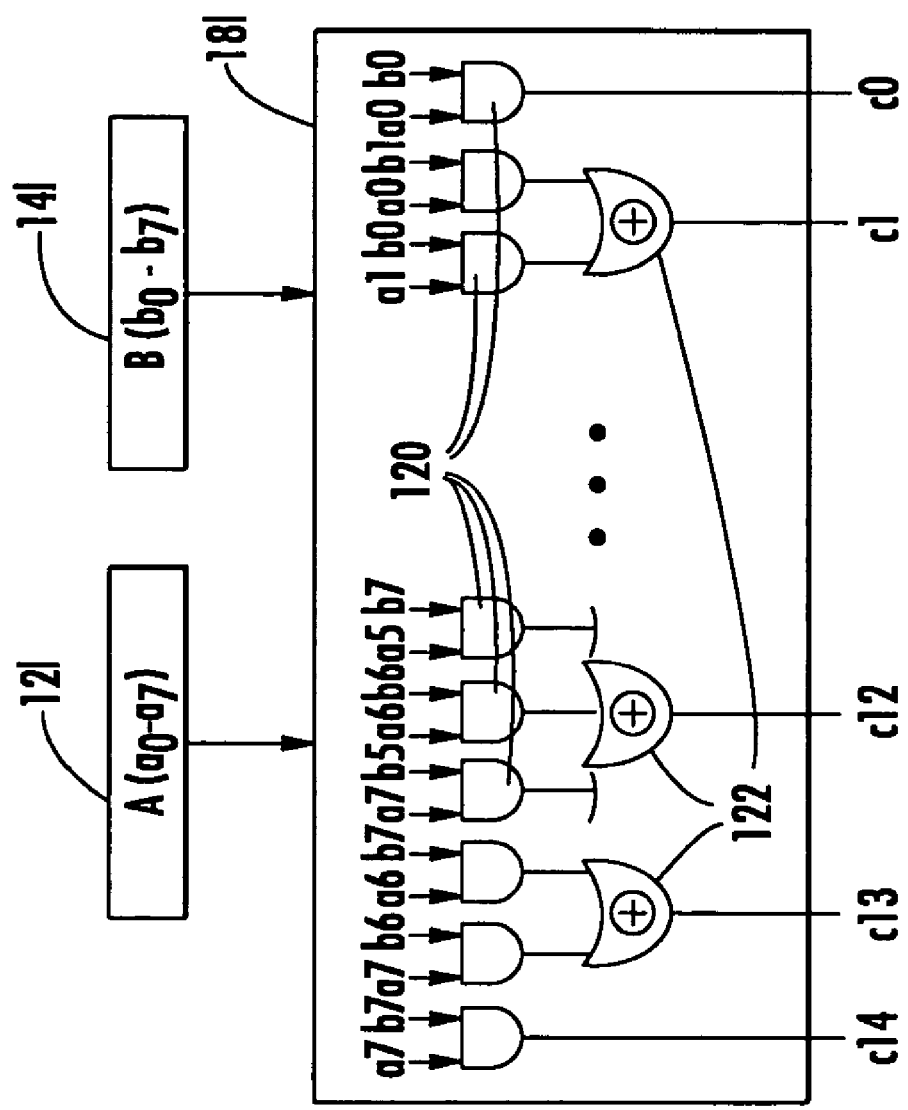
FIG. 11 is a schematic view of a polynomial multiplier usable in FIGS. 2, 3, 5 and 9.
Figures 12, 15:
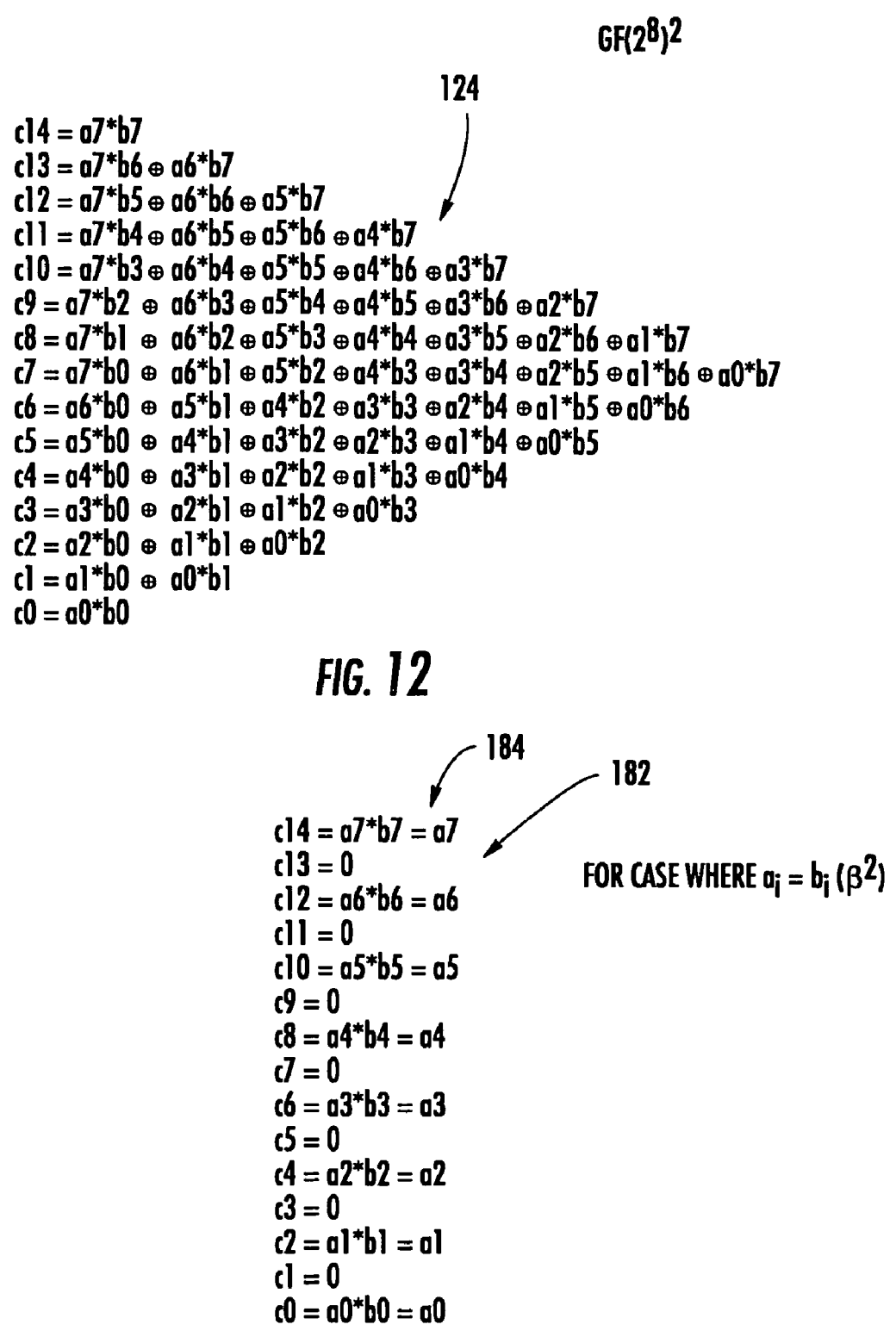

A polynomial multiplier circuit 181, FIG. 11, usable in the embodiment shown herein to provide an output c0-c14 includes a plurality of AND gates 120 which combined with exclusive OR gates 122 can multiply any pair of polynomials from A register 121 and B register 141 e.g., polynomials $a_0$-$a_7$, polynomials $b_0$-$b_7$ as illustrated in the table 124 FIG. 12.

Figure 13:
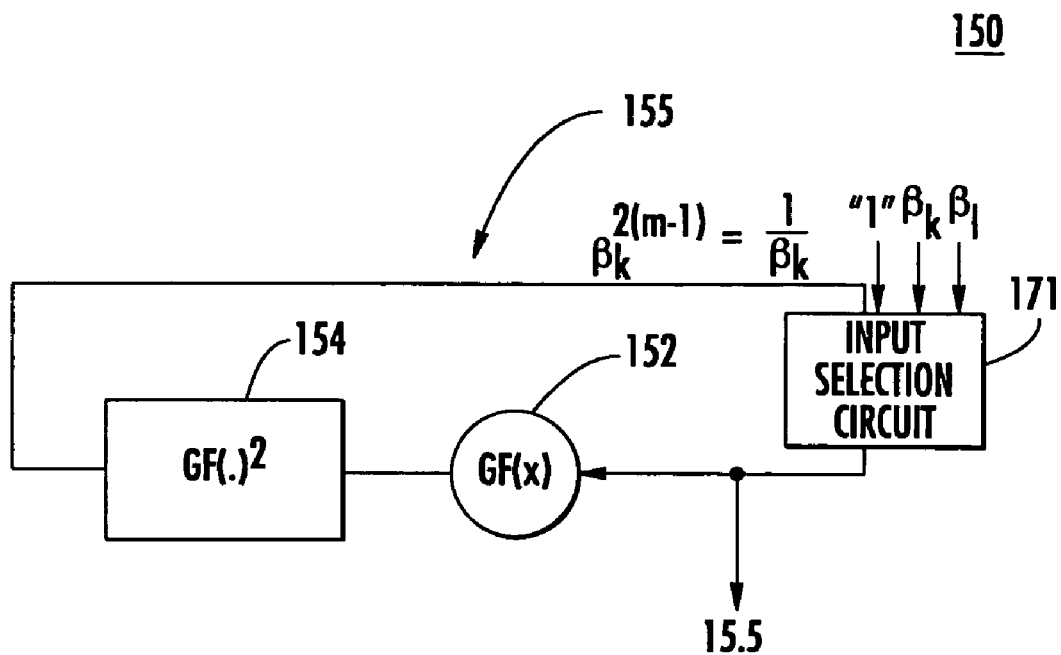
FIG. 13 is a simplified schematic block diagram of a divider engine according to this invention.

There is shown in FIG. 13 a Galois field divider engine 150 according to this invention including a Galois field reciprocal generator 155 having a Galois field multiplier 152 and a second Galois field multiplier 154 for performing a squaring function. Engine 150 performs the division $\beta_1/\beta_k$ by executing the operation $\beta_1 * 1/\beta_k$, where $\beta_1$ and $\beta_k$ are elements of a Galois field, for example, where m=8, that is $GF(2^8)$: the degree of the field is eight. Initially Galois field multiplier 152 receives a 1 and $\beta_k$ and multiplies them together. The output is then squared in Galois field multiplier 154 and fed back to Galois field multiplier 152. This result is multiplied by $\beta_k$ over and over again for m−2 times so that a total of m−1 iterations has occurred. At this point the reciprocal $1/\beta_k$ is obtained and instead of $\beta_k$ being supplied as it has been for each of the m−2 iterations it is now $\beta_1$ that is supplied to perform the multiplication $\beta_1 * (1/\beta_k)$. Thus, the entire division takes place in a total of m iterations, m−1 for generating the reciprocal and 1 more for multiplying the reciprocal of the divisor and the dividend to get the quotient. The timely application of "1", $\beta_k$ and $\beta_1$ is performed by input selection circuit 171.

The fact that $$\beta^{2^{m-2}} = \frac{1}{\beta}$$

is shown by the following exposition, given: the field of GF(q) is made up from the numbers {0, 1 . . . (q−1)}. If we multiply by β (β is a field member≠0) each member of {1, 2 . . . (q−1)} to get {1β0, 2β . . . (q−1)β} we can easily see that we get the same set back again (with the order changed). This means that 1, ·2· . . . ·(q−1)=1β·2β· . . . ·(q−1)β=1·2· . . . ·(q−1)β$^{(q-1)}$ by cancelling the factors 1·2· . . . (q−1) from both sides assures us that $$\beta^{q-1}=1. \tag{1}$$

Therefore $$\beta^{-1}=\beta^{q-2} \tag{2}$$

Replacing q with $2^m$ results in the expression $$\beta^{2^{m-2}} = \frac{1}{\beta} \tag{3}$$

FIG. 13 is a straightforward implementation of this expression.

According to (3) for n=7 we need to calculate $\beta^{254}$. $\beta^{254}$ can be calculated as $\beta[1]^{128} \cdot \beta^{64} \cdot \beta^{32} \cdot \beta^{16} \cdot \beta^8 \cdot \beta^4 \cdot \beta^2$. Which can be iteratively calculated as $n = 1: \quad (\beta \cdot 1)^2 = \beta^2$ $n = 2: \quad (\beta^2 \cdot 1)^2 = \beta^4 \cdot \beta^2$ $n = 3: \quad (\beta^4 \cdot \beta^2 \cdot \beta)^2 = \beta^8 \cdot \beta^4 \cdot \beta^2 = \beta^{14}$ $\vdots$ $n = 7: \quad (\beta^{64} \cdot \beta^{32} \cdot \beta^{16} \cdot \beta^8 \cdot \beta^4 \cdot \beta^2 \cdot \beta \cdot)^2 =$
$\beta^{128} \cdot \beta^{64} \cdot \beta^{32} \cdot \beta^{16} \cdot \beta^8 \cdot \beta^4 \cdot \beta^2 = \beta^{254}$ The circuit of FIG. 13 starts from an initial value of 1 and generates at 155 the following successive values:

| | Iteration # | | | | | | |
|---|---|---|---|---|---|---|---|
| | 1 | 2 | 3 | 4 | 5 | 6 | 7 |
| Value at Point 155 | $\beta^2$ | $\beta^6$ | $\beta^{14}$ | $\beta^{30}$ | $B^{62}$ | $\beta^{126}$ | $B^{254}$ |

As can be seen, the final value of $\beta^{-1}$ is obtained in (n−1) cycles. The same circuit is generating $\beta^{-1}$ for all intermediate powers of m GF($2^m$) {m=3.7}, for example if m=4, $\beta^{2^m-2}=14$ is generated at n=3.

Figure 14:
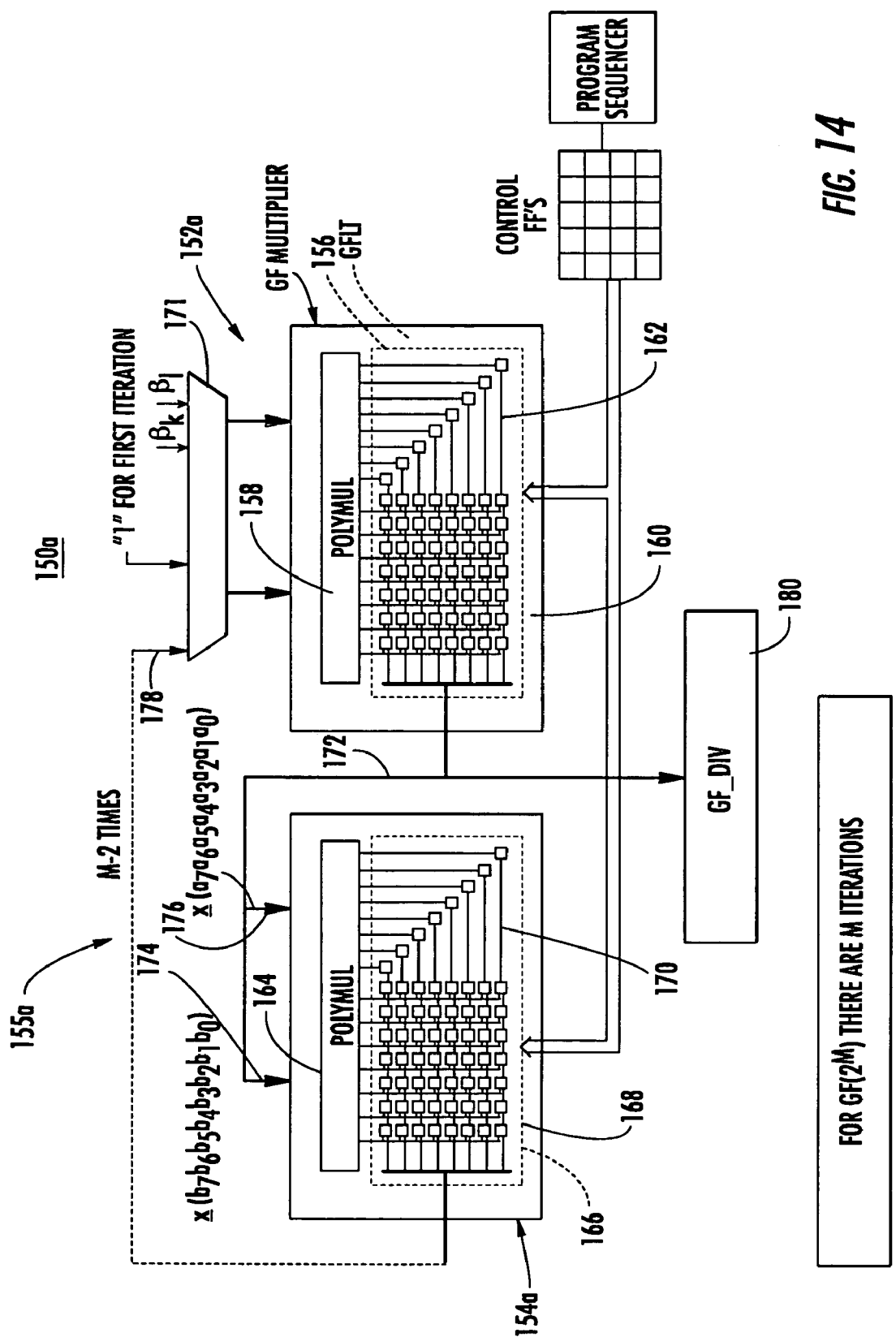
FIG. 14 is a more detailed view of the Galois field multiplier and squarer of FIG. 13.

In one embodiment, Galois field reciprocal generator 155a, FIG. 14, may include Galois field multiplier 152a and Galois field multiplier 154a. Galois field multiplier 152a includes Galois field linear transformer 156 and a polynomial multiplier 158. Galois field multiplier 156 is shown as including a matrix of exclusive OR cells having two sections, matrix section 160 and reduced unity matrix section 162, but this is not a necessary limitation of the invention as unity matrix section 162 may be implemented with a full matrix as is matrix section 160 if size is not an issue. Galois field multiplier 154a also includes a polynomial multiplier 164 and Galois field transformer 166 which also may include, but not necessarily, a full matrix section 168 and a reduced unity matrix section 170. Here again unity section 170 is advantageous as to cost and area but it is not necessary as a full section could be used there. Galois field divider engine 150a performs a division in m iterations. In the first iteration input selection circuit 171 introduces a 1 in combination with $\beta_k$ to Galois field multiplier 152a. This produces an output $\beta_k$ on line 172 which is delivered to both polynomial multiplier inputs 174, 176 of Galois field multiplier 154a. Thus, a squaring function is performed and the output is fed back to an input 178 of input selection circuit 171. This iteration occurs m−2 times where m is the degree of the Galois field. After m−2 iterations input selection circuit 171 introduces the dividend $\beta_1$ to Galois field multiplier 152a because at that time the value at output 178 is the reciprocal $1/\beta_k$. By now multiplying $\beta_1$, the dividend, times $1/\beta_k$, the divisor, the result is $\beta_1$ is divided by $\beta_k$ to obtain the quotient of the Galois field division at 180.

The values at inputs 174 and 176 take the form of, from the most significant digit to the least, $b_7$-$b_0$ and $a_7$-$a_0$. When the squaring function is being performed as here, then each of the values $b_7$-$b_0$ will be the same, respectively, as each of the values of $a_7$-$a_0$ because they are the same numbers. The number of digits $b_7$-$b_0$, $a_7$-$a_0$ depends upon the size of the polynomial, which in this case where m is 8 would be eight digits. Whatever the size, since the values are the same at both inputs, the exclusive OR function will be zero. That is, like inputs to an exclusive OR gate renders a zero output as is well known. Thus, referring again to FIG. 12, it can be seen that for each of the polynomial multiply outputs $c_0$-$c_{14}$, the odd-numbered ones in FIG. 12 contain pairs of identical values. For example, $c_1$ is equal to $a_1 * b_0 \oplus a_0 * b_1$. Since we are squaring we know that the two values being presented at inputs 174 and 176 are the same, therefore $a_0$ and $b_0$ are the same and $a_1$ and $b_1$ are the same. Therefore, $c_1$ when exclusively ORed will have a value of zero. The same is true for the rest of the odd numbered Galois field multiplier outputs $c_3$, $c_5$, $c_7$, $c_9$, $c_{11}$, $c_{13}$. The result is shown at 182, FIG. 15 where it can be seen not only that there are zero values resulting at the odd numbered $c_1$-$c_{13}$, but that the remaining non zero even numbered values require no exclusive OR gates, only multiplication. For example, $c_0$ is $a_0 * b_0$. But this is a simple AND function resulting in a value of $a_0$. Similarly, with respect to $c_2$ the value $a_1$ is multiplied by $b_1$ giving an AND function which results in the simple output of $a_1$. The same effect is true in $c_4$, $c_6$, $c_8$, $c_{10}$, $c_{12}$, and $c_{14}$. The same applies to Galois field multiplier 156b, FIG. 16. Galois field multiplier 154b which effects the squaring function can be reduced in size by one half shown by the reduction by one half of the matrix section 168b and unity section 170b. Also, now since the function has turned into a simple input as shown in column 184, FIG. 15, two separate inputs are not required and so the polynomial multiplier 164 is no longer needed.

Galois field transformers 156c and 166c, FIG. 17, are implemented identically. The shaded circles indicate the enabled exclusive OR gate cells in each of the transformers. The programming is accomplished by the codes in column 190 and is the same for both transformers 156c and 166c. Transformer 156c receives the inputs $c_0$-$c_{14}$ and provides the outputs $A_0$-$A_7$. These form the inputs with the zeros of $A_0$-$A_7$ of Galois field linear transformer 166c whose final outputs are $B_0$-$B_7$. Both transformers have been implemented for the Galois field of degree eight GF($2^8$) (m=8) for the irreducible polynomial (O×12b). When the reduction shown in FIG. 15 is effected, Galois field multiplier 156d, FIG. 18 stays the same as do all of the programming instructions in the column 190d, but Galois field linear transformer 166d has had every other column, the zero columns, eliminated, resulting in the structure shown in FIG. 16.

Figure 16:
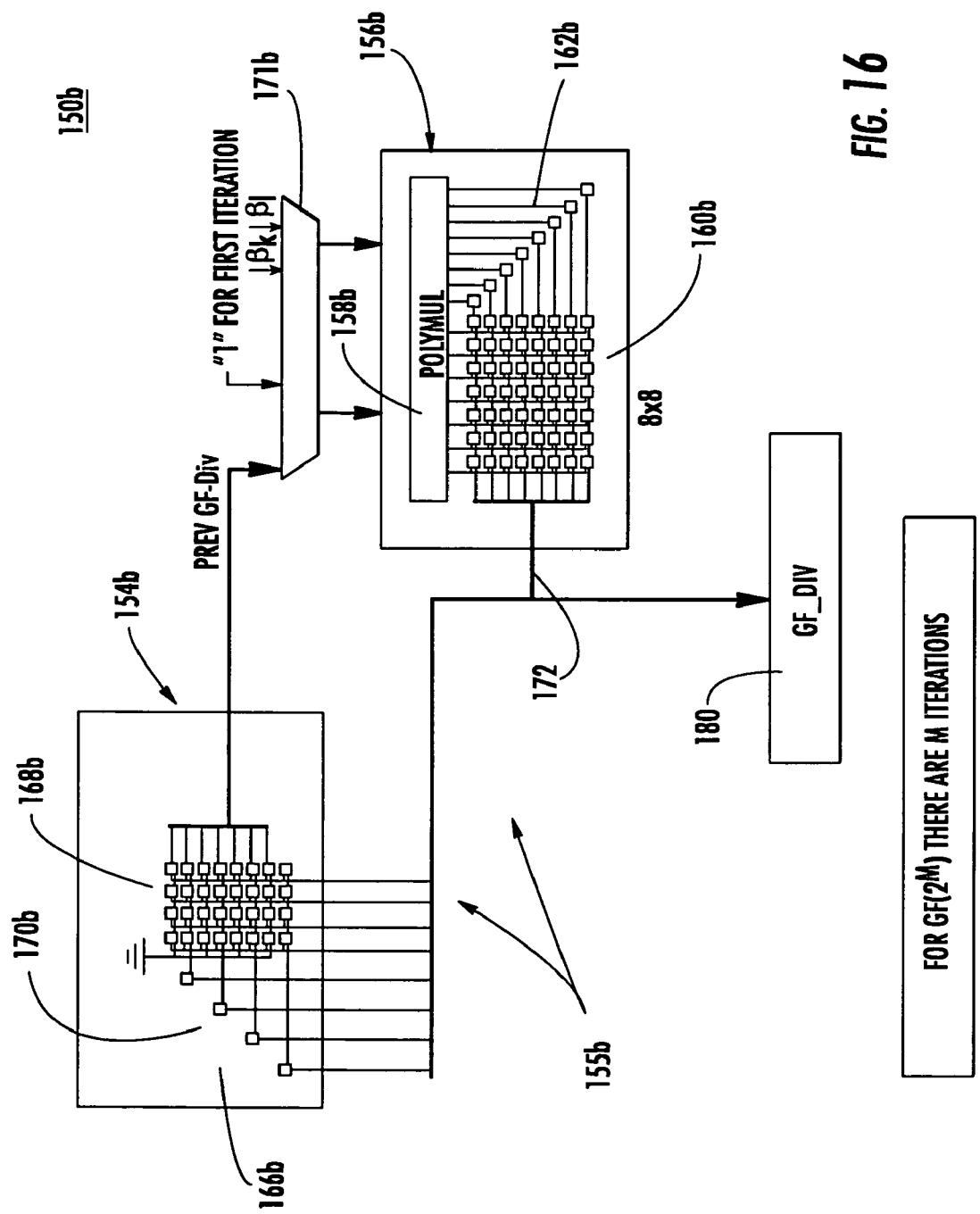
FIG. 16 is a view of a Galois field multiplier and squarer similar to that of FIG. 14 implementing the reduced transfer function of FIG. 15.

When the Galois field divider engine has been reduced as shown in FIG. 16, a further reduction is now achievable. Because Galois field divider engine 154b has no polynomial multiplier in the second Galois field transformer 166b, a single matrix or transformer can be constructed which delivers the output $B_0$-$B_7$ directly from $c_0$-$c_{14}$ without the interim $A_0$-$A_7$ terms, in one cycle and using a single linear transformer 200, FIG. 19. Transformer 200 has been programmed to have the combination of exclusive OR cells indicated by the shaded circles enabled in order to perform both of the Galois field linear transforms in one Galois field linear transformer and in one operation. Thus, the inputs $c_0$-$c_{14}$ are directly transformed by Galois field linear transformer 200 to the ultimate outputs $B_0$-$B_7$. The compounding which reduces the two matrices 156d and 166d, FIG. 18, to the single matrix Galois field linear transformer 200 in FIG. 19 can be seen by a simple illustration using $B_7$, FIG. 18, which can be seen as equivalent to the exclusive ORs $A_7$, $A_6$, and $A_5$, as shown in Galois field linear transformer 166d. Referring then to Galois field linear transformer 156d (where the backslash indicates a cancellation of a term because it is duplicated), it can be seen that $A_5$ is equal to $c_{14}$, $c_{13}$, $c_{12}$, $\cancel{c_{11}}$, $\cancel{c_{10}}$, $c_8$, $c_5$ $A_6$ is equal to $\cancel{c_{14}}$, $\cancel{c_{13}}$, $\cancel{c_{12}}$, $\cancel{c_{11}}$, $c_9$, $c_6$, $A_7$ is equal to $\cancel{c_{14}}$, $\cancel{c_{13}}$, $\cancel{c_{12}}$, $\cancel{c_{10}}$, and $c_7$, all with the exclusive OR functions between them. This results in the output $c_{14}$, exclusive OR $c_{13}$, exclusive OR $c_{12}$, exclusive OR $c_9$, exclusive OR $c_8$, exclusive OR $c_7$, exclusive OR $c_6$, exclusive OR $c_5$. Thus, in matrix 200, FIG. 19, $B_7$ can be seen to include the exclusive OR combination of $c_{14}$, $c_{13}$, $c_{12}$, $c_9$, $c_8$, $c_7$, $c_6$, and $c_5$. One implementation of such a compounded Galois field divider engine 202 is shown in FIG. 20 where Galois field linear transform, matrix 200 of FIG. 19 appears in conjunction with a polynomial multiplier 204 and input selection circuit 171e with dual input selection units 206, 208. Now the Galois field reciprocal generator 205 has been implemented by a single, compound Galois field linear transformer 200. Input selection unit 206 is capable of performing multiply-add (MPA), multiply-accumulate (MAC), and multiply (MPY). Input selection unit 208 functions similarly and provides to Galois field linear transformer 200 the adder input as previously explained. Program sequencer 210 provides the mapping of the control flip-flops 212 which enable and disable the matrix of cells including the exclusive OR gates. The program sequencer can program the GFLT matrix 200 as a compound multiplier performing $(GF\_MPY(\alpha,\beta))^2$ in one cycle for division as a Galois field multiplier for multiplication, as a multiply and accumulate for multiply and accumulation and as a multiply-add for the multiply-add function.

Figure 21:
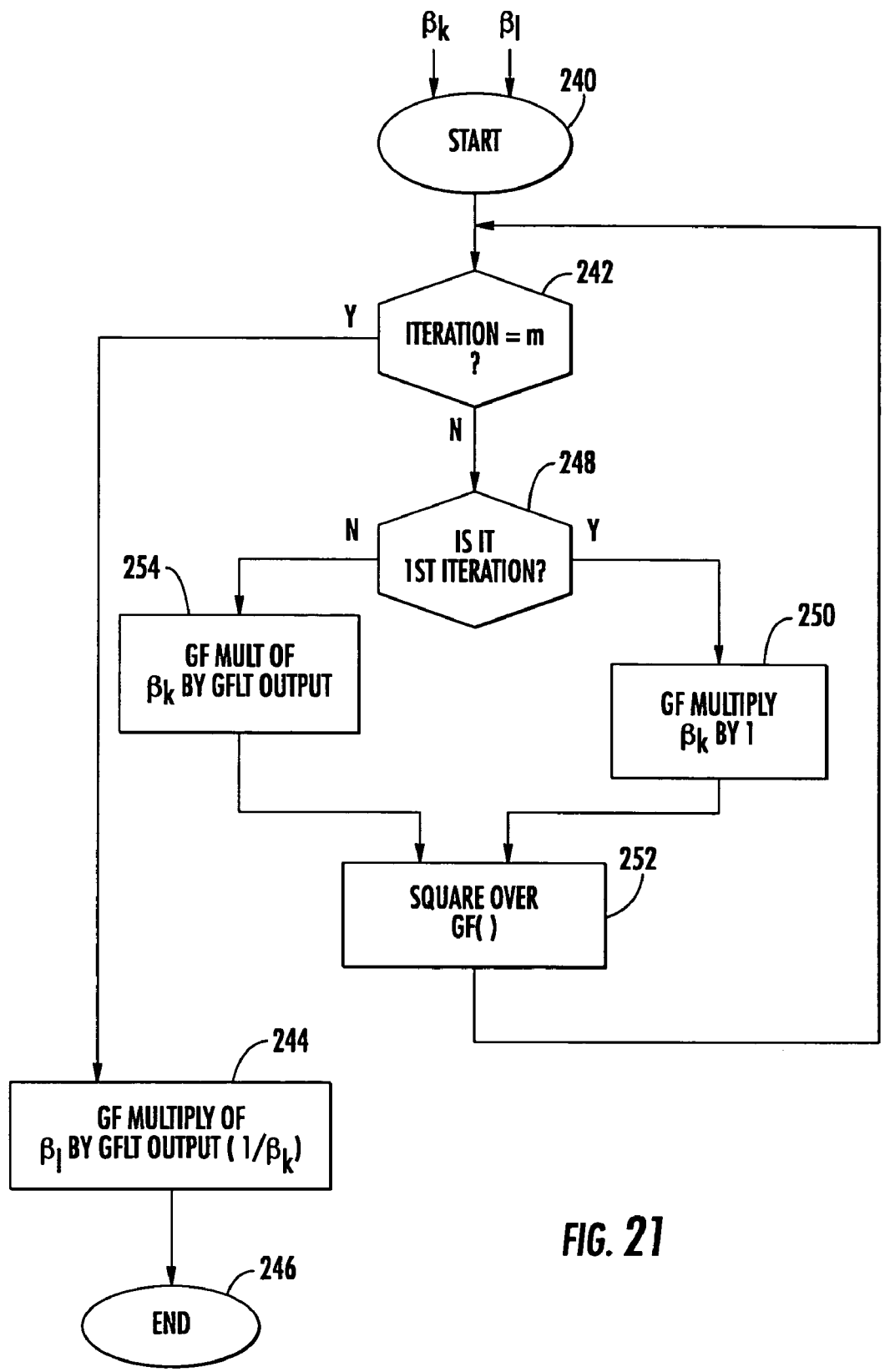
FIG. 21 is a flow chart of the Galois field divider method according to this invention.

In operation, initially the GFLT is programmed as a compound multiplier performing $(GF\_MPY(\alpha,\beta))^2$, a 1 is provided at input 214 and $\beta_k$ at input 216. Following that for m−2 iterations, the output 180 is fed back on input 214 while $\beta_k$ remains on input 216. After m−2 iterations, when the system has gone through a total of m−1 iterations, the input at 214 is now the reciprocal of $\beta_k$. At this point the GFLT is programmed as a Galois Field multiplier, $\beta_k$ at input 216 is now replaced with input $\beta_1$ so that the next multiplication, the $m^{th}$ iteration, multiplies $\beta_1$ times the reciprocal of $\beta_k$ to provide the output $\beta_1$ divided by $\beta_k$. The Galois field division method of this invention is shown in FIG. 21 where the divisor $\beta_k$ and dividend $\beta_1$ are provided at start 240. A query is then made as to whether this iteration is the $m^{th}$ iteration in step 242, where m is the degree of the Galois field involved. If it is the mth iteration, the system goes directly to step 244 where the Galois field multiplication of $\beta_k$ by the Galois field linear transform output of the reciprocal $1/\beta_k$ is performed. The quotient is then produced at 246. If the iteration has not reached m, then the query is made in step 248 as to whether it is the first iteration. If it is, multiplication of $\beta_k$ by 1 is effected in step 250 and then the square of that value is performed over a Galois field in step 252. If it is not the first iteration, then in step 254, the Galois field multiplication of $\beta_k$ by the Galois field linear transform output is performed and then the square is performed in Galois field multiplier in step 252. The output from the square calculation is then fed back, step 242, and the iteration begins again.

Figure 19:
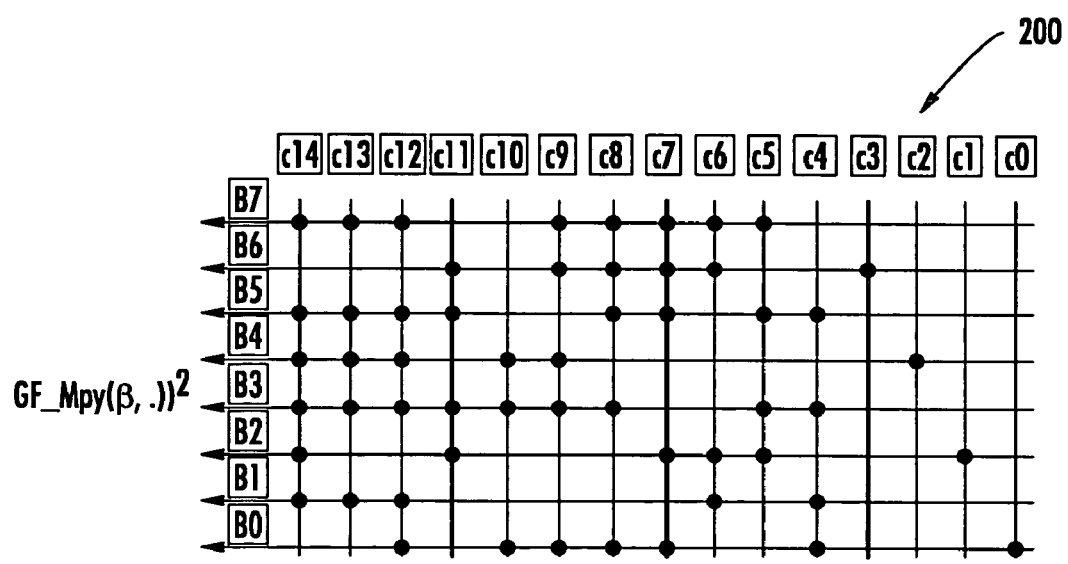
FIG. 19 is a schematic illustration of the pattern of enabled cells of a compound Galois linear engine for compound Galois field engine for performing a succession of Galois field linear transforms on a succession of polynomial inputs to obtain an ultimate output e.g. division according to a more general feature of this invention.
Figure 20:
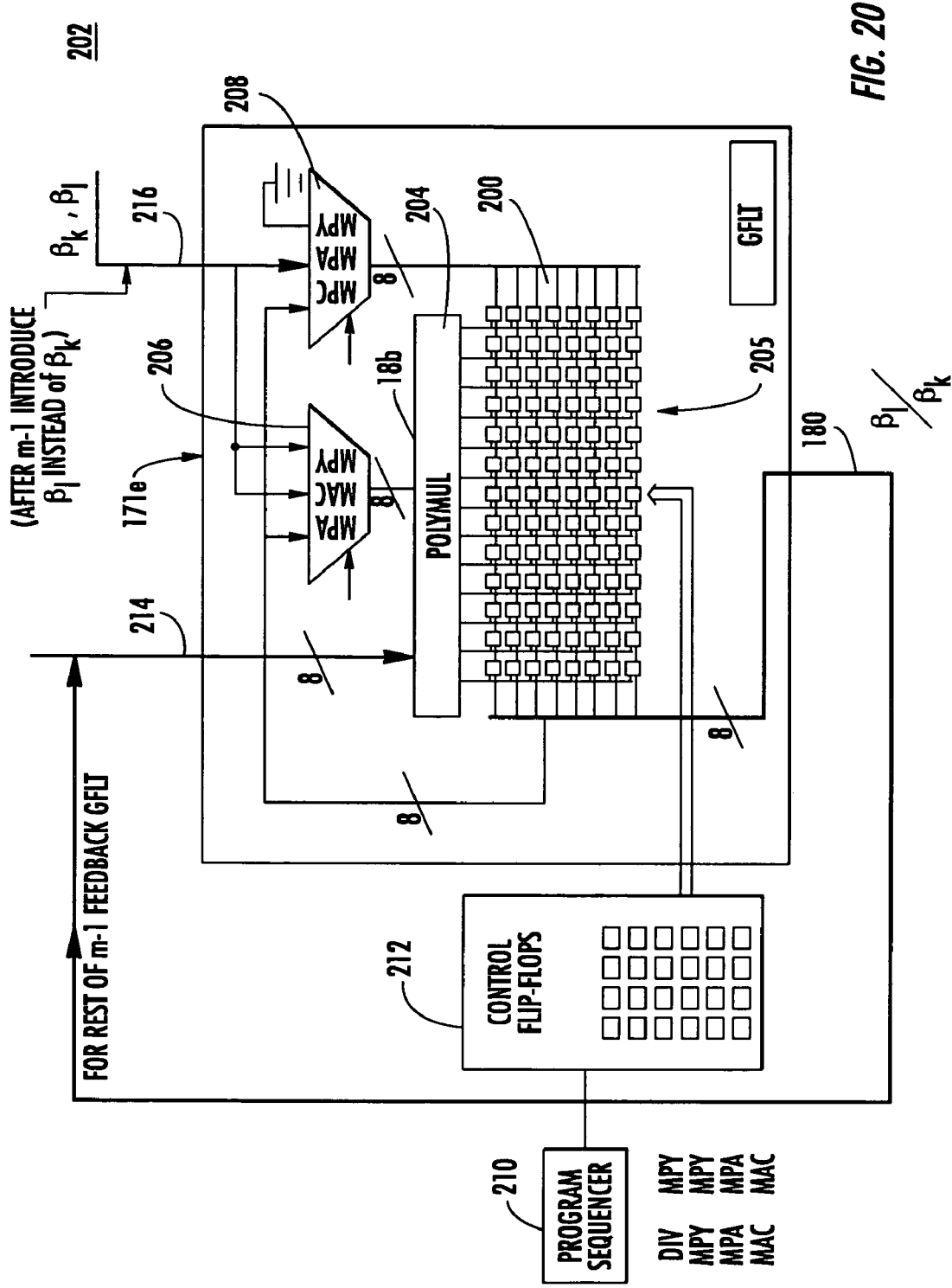
FIG. 20 is a simplified schematic diagram of a compound Galois field engine utilizing the Galois field transform illustrated in FIG. 19.

Thus far the invention has focused on a Galois field divider engine and method and to the ability to reduce that engine in size by first reducing the size of one of the Galois field linear transformers and eliminating one of the polynomial multipliers and then by combining the functions of the two linear transformers so that a succession of Galois field linear transforms on a succession of polynomial inputs is performed to obtain the ultimate output (quotient) as shown in FIGS. 19 and 20. But, this is not a necessary limitation of the invention, that is it is not limited to merely division. A compound Galois field engine according to this invention may perform any succession of Galois field linear transforms on a succession of polynomial inputs to obtain an ultimate output where each input, except the first, is the output of the previous Galois field linear transform. That is in one transform it can immediately predict the modulo remainder of the succession of Galois field linear transforms of an irreducible Galois field polynomial to obtain the ultimate output of the Galois field linear transform directly from the first input.

Figure 22:
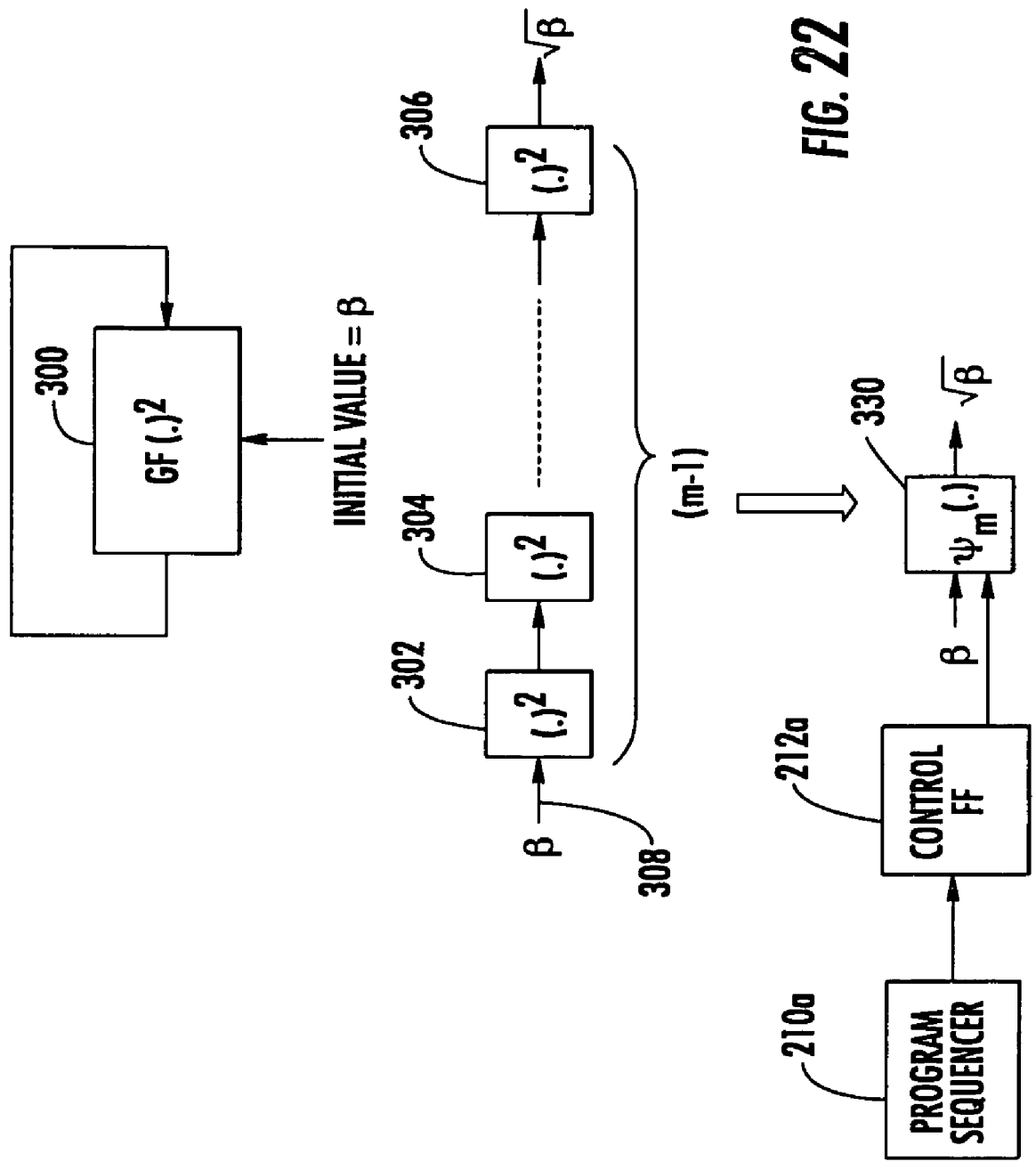
FIG. 22 is a schematic block diagram of a square root engine according to this invention.

Another example of this fact can be seen in the square root operation of a Galois field member $\beta$. There is shown in FIG. 22 a compound Galois field engine 300 according to this invention that performs (m−1) successive Galois field linear transforms 302, 304 . . . 306 wherein a first input $\beta$, 308 is submitted to Galois field transformer 302 and then the transformed output becomes the input to the next Galois field linear transformer 304, whose output becomes the input to the next Galois field linear transformer, and so on, until it reaches the final transformer 306 as in this case, the $\sqrt{\beta}$ output. In accordance with this invention, by compounding the Galois field linear transformers as shown in 310 FIG. 23, the (m−1) transformers of FIG. 22 can be reduced to produce the simplified implementation shown in FIG. 23 of only one GFLT, where, the initial input $\beta$ can be transformed in a single operation by the compound Galois field linear transformer square root engine 330 to provide in one iteration, the $\sqrt{\beta}$ output.

The fact that $\sqrt{\beta}=\beta^{2^{(m-1)}}$ is shown by the following exposition given: in (1) we have shown that $\beta^{q-1}=1$.

Replacing q with $2^m$ and multiplying both sides by $\beta$ results in the expression $$\beta^{2^m}=\beta \tag{4}$$

Taking $\sqrt{}$ the/form both sides results in the expression $$\beta^{(2^m)/2}=\sqrt{\beta} \tag{5}$$

or $$\beta^{2^{(m-1)}}=\sqrt{\beta} \tag{6}$$

FIG. 22 is a straightforward implementation of this expression.

Figure 23:
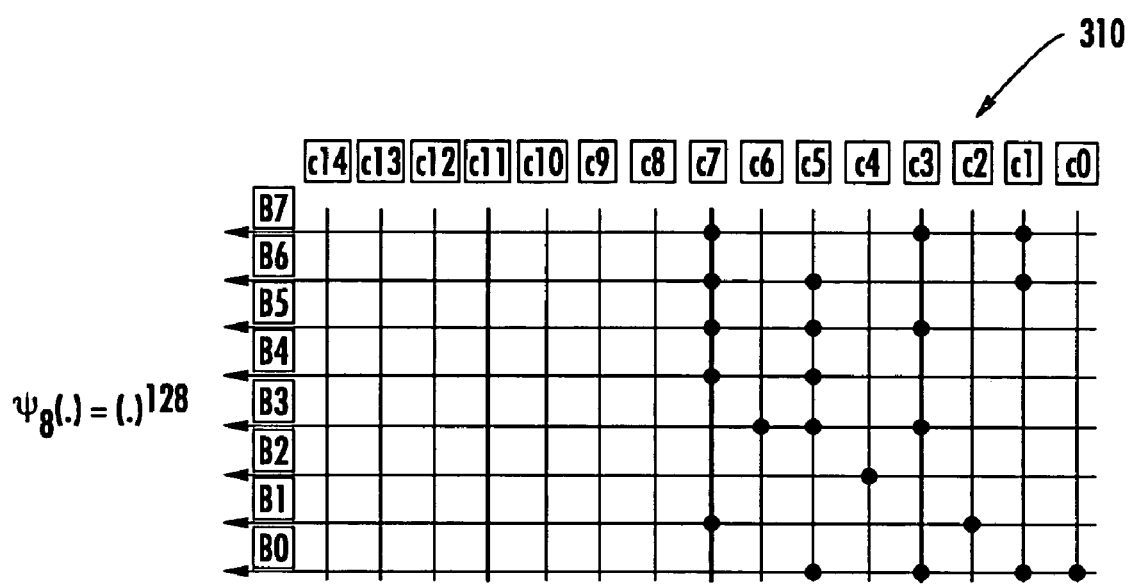
FIG. 23 is a schematic illustration of the pattern of enabled cells of a compound Galois field linear engine for performing a succession of Galois field linear transforms on a succession of polynomial inputs as shown in FIG. 22 to obtain an ultimate output e.g. square root according to the more general feature of this invention.
Figure 24:
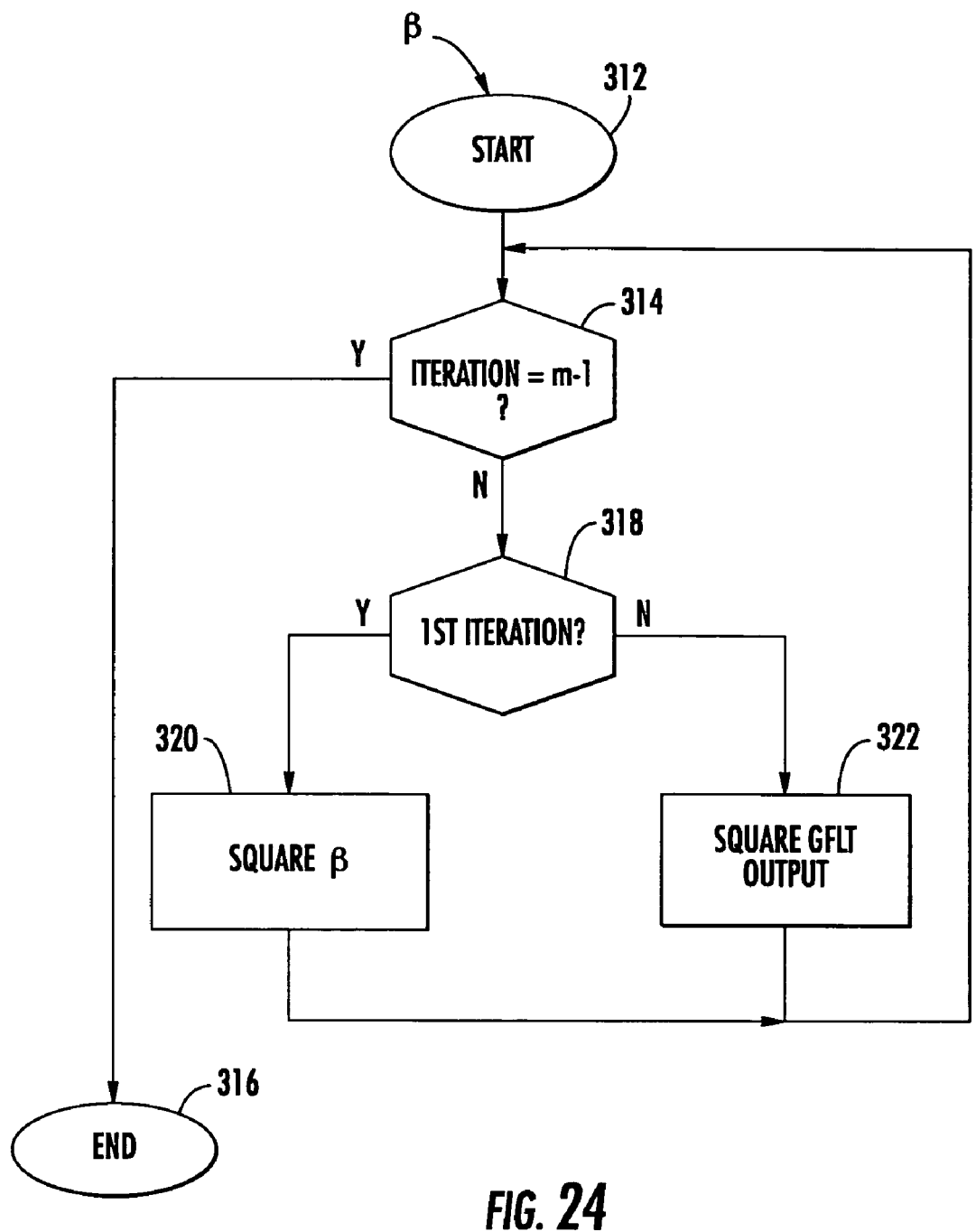
FIG. 24 is a flow chart of the Galois field square root method according to this invention.

The Galois field square root method of this invention is shown in FIG. 24 where the field element $\beta$ are provided at start 312. A query is then made as to whether this iteration is the $m^{th}-1$ iteration in step 314, where m is the degree of the Galois field involved. If it is the $m^{th}-1$ iteration, the system goes directly to step 316 where the Galois field square root of $\beta$ is produced. If the iteration has not reached m−1, then the query is made in step 318 as to whether it is the first iteration. If it is, the square of that $\beta$ value is performed over a Galois field in step 320. If it is not the first iteration, the square of the Galois field linear transform output is performed over a Galois field in step 322. The output from the square calculation is then fed back, step 314, and the iteration begins again. A programming circuit, control flip-flops 212a and programming sequencer 210a, programs the Galois field linear transformer square root engine 330 as shown in FIG. 23.

Figure 25:
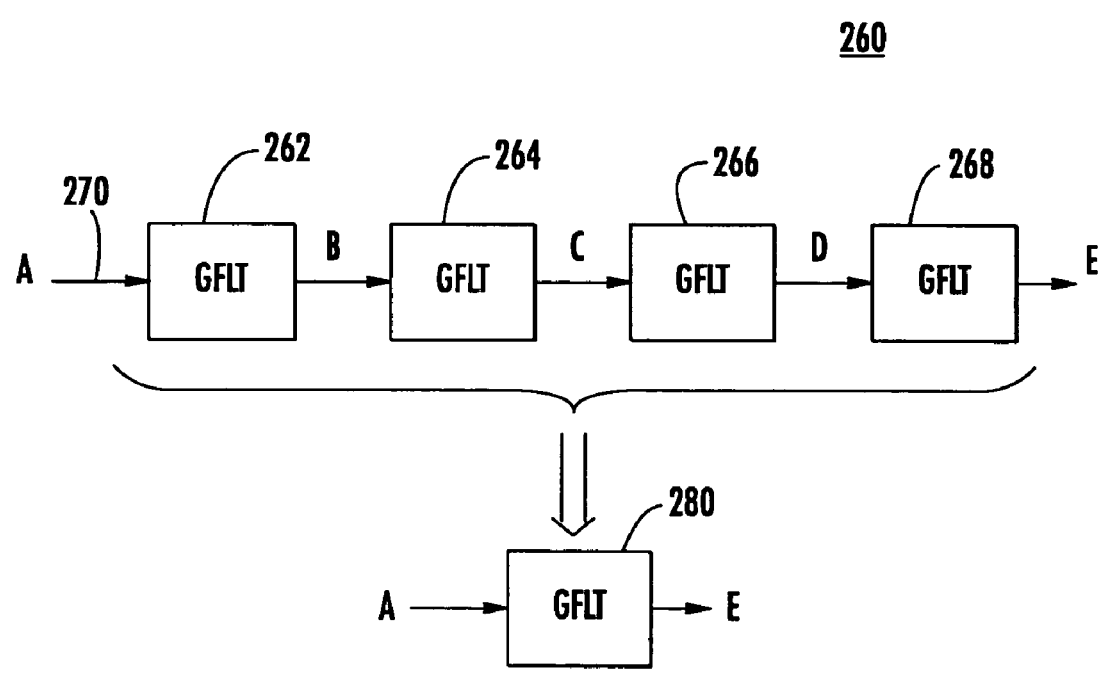
FIG. 25 is a simplified block diagram of a compound Galois field engine according to this invention.

In summary, generally a compound Galois field engine 260, FIG. 25 according to this invention may perform a number of successive Galois field linear transforms 262, 264, 266, 268 wherein a first input A, 270 is submitted to Galois field transformer 262 and then the transformed output B becomes the input to the next Galois field linear transformer 264, whose output C in turn becomes the input to the next Galois field linear transformer, 266 whose output D becomes the input to the next Galois field linear transformer 268, and so on. In this case, the ultimate output is E. In accordance with this invention, by compounding the Galois field linear transformers as shown in FIG. 19, by reducing the two transformers of FIG. 18 to produce the implementation shown in FIG. 20, the initial input A can be transformed in a single operation by compound Galois field linear transformer 280 to provide in that one iteration, the ultimate output E.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A Galois field divider engine for providing division operations for forward error correction and/or error detection over a Galois field, the Galois field divider engine comprising:
    a Galois field reciprocal generator circuit, said Galois field reciprocal generator circuit including first and second Galois field multiplier circuits, an output of said first Galois field multiplier circuit fed to both inputs of said second Galois field multiplier circuit to provide the square of the output of said first Galois field multiplier circuit;
    an input selection circuit for initially inputting a 1 and a first Galois field element to the Galois field reciprocal generator circuit to obtain an output, subsequently multiplying in the Galois field reciprocal generator circuit the first Galois field element by the output of the second Galois field reciprocal generator circuit for predicting a modulo remainder of the multiply-square of the polynomial product of an irreducible polynomial m−2 times where m is the degree of the Galois field, to obtain the reciprocal of the first Galois field element and multiplying in the Galois field divider engine the reciprocal of the first Galois field element by a second Galois field element for predicting a modulo remainder of the polynomial product for an irreducible polynomial to obtain the quotient of the two Galois field elements in m cycles.

2. The Galois field divider engine of claim 1 in which said Galois field multiplier circuit includes only one Galois field multiplier programmed to perform a compound multiply-square operation.

3. The Galois field divider engine of claim 1 in which said first Galois field multiplier circuit includes a first polynomial multiplier circuit and a first Galois field linear transformer.

4. The Galois field divider engine of claim 3 in which said first Galois field linear transform includes a matrix of cells.

5. The Galois field divider engine of claim 4 in which said first Galois field linear transform matrix of cells includes a matrix section and a unity matrix section.

6. The Galois field divider engine of claim 1 in which said second Galois field multiplier circuit includes a second polynomial multiplier circuit and a second Galois field linear transformer.

7. The Galois field divider engine of claim 6 in which said second Galois field linear transform includes a matrix of cells.

8. The Galois field divider engine of claim 7 in which said second Galois field linear transform matrix of cells includes a matrix section and a unity matrix section.

9. The Galois field divider engine of claim 1 in which the output of said first Galois field multiplier circuit is fed to both multiply inputs of said second Galois field linear multiplier circuit to provide the square of that output.

10. The Galois field divider engine of claim 1 in which said second Galois field multiplier is less than approximately one half the size of said first Galois field multiplier.

11. The Galois field divider engine of claim 10 in which said first and second Galois field transformers each includes a matrix of cells and said second Galois field transformer includes approximately one half the number of cells of said first Galois field transformer.

12. A Galois field divider engine for providing division operations for forward error correction and/or error detection over a Galois field, the Galois field divider engine comprising:
    a Galois field reciprocal generator including a Galois field multiplier circuit, and a program circuit for programming said Galois field multiplier circuit to perform a compound multiply-square operation; and
    an input selection circuit for initially inputting a 1 and a first Galois field element to the Galois field reciprocal generator to obtain an output, subsequently multiplying and squaring in the Galois field reciprocal generator the first Galois field element by the output of the Galois field reciprocal generator for predicting a modulo remainder of the square of the polynomial product of an irreducible polynomial m−2 times, to obtain the reciprocal of the first Galois field element and multiplying the reciprocal, of the first Galois field element by a second Galois field element for predicting the quotient of the two Galois field elements in m cycles.

13. A Galois field divider method for providing a division operation for forward error correction and/or error detection over a Galois field, the method comprising:
    providing a Galois field reciprocal generator circuit including first and second Galois field multiplier circuits, an output of said first Galois field multiplier circuit fed to both inputs of said second Galois field linear multiplier circuit to provide the square of the output of said first Galois field multiplier circuit;
    initially inputting a 1 and a first Galois field element to the Galois field reciprocal generator circuit to obtain an output;
    multiplying in the Galois field reciprocal generator circuit the first Galois field element by the output of the second Galois field multiplier circuit for predicting a modulo remainder of the multiply-square of the polynomial product of an irreducible polynomial m−2 times where m is the degree of the Galois field to obtain the reciprocal of the first Galois field element; and
    multiplying in the Galois field reciprocal generator circuit the reciprocal of the first Galois field element by a second Galois field element for predicting a modulo remainder of the polynomial product for an irreducible polynomial to obtain the quotient of the two Galois field elements in m cycles.

* * * * *

UNITED STATES PATENT AND TRADEMARK OFFICE
CERTIFICATE OF CORRECTION

PATENT NO. : 7,895,253 B2
APPLICATION NO. : 10/440330
DATED : February 22, 2011
INVENTOR(S) : Yosef Stein et al.

It is certified that error appears in the above-identified patent and that said Letters Patent is hereby corrected as shown below:

In the Specification, Column 1, lines 7 to 37, cancel the text under "Related Applications," and insert the following:

-- This application claims priority to U.S. patent application No. 10/395,620, filed Mar. 24, 2003, now Patent No. 7,177,891, which claims priority to U.S. Provisional application No. 60/417,384, filed Oct. 9, 2002; U.S. patent application No. 10/051,533, filed Jan. 18, 2002, now U.S. Patent No. 6,587,864, which claims priority to U.S. Provisional application No. 60/334,662, filed Nov. 30, 2001; U.S. patent application Ser. No. 10/060,699, filed Jan. 30, 2002, now U.S. Patent No. 6,766,345, which claims priority to U.S. Provisional application No. 60/334,662, filed Nov. 30, 2001 and to U.S. Provisional application No. 60/334,510, filed Nov. 30, 2001; U.S. patent application No. 10/228,526, filed Aug. 26, 2002, now U.S. Patent No. 7,082,452, which claims priority to U.S. Provisional application No. 60/334,662, filed Nov. 30, 2001; U.S. Provisional application No. 60/334,510, filed Nov. 30, 2001; U.S. Provisional application No. 60/341,635, filed Dec. 18, 2001; and U.S. Provisional application No. 60/341,711, filed Dec. 18, 2001; and U.S. patent application No. 10/136,170, filed May 1, 2002, now U.S. Patent No. 7,269,615, which claims priority to U.S. Provisional application No. 60/341,737, filed Dec. 18, 2001, the entire disclosures of which are incorporated by reference herein. --

Signed and Sealed this
First Day of November, 2011

David J. Kappos
*Director of the United States Patent and Trademark Office*